(12) United States Patent
Mita et al.

(10) Patent No.: US 7,680,398 B2
(45) Date of Patent: Mar. 16, 2010

(54) RECORDING DEVICE, INFORMATION RECORDING MEDIUM AND RECORDING METHOD

(75) Inventors: Hideaki Mita, Kobe (JP); Yoshiho Gotoh, Osaka (JP); Tatsushi Bannai, Sakai (JP); Takashi Furukawa, Shinagawa-ku (JP); Hideki Ando, Shinagawa-ku (JP); Hisao Tanaka, Shinagawa-ku (JP); Motohiro Terao, Shinagawa-ku (JP)

(73) Assignees: Panasonic Corporation, Kadoma (JP); Sony Corporation, Tokyo (JP)

( * ) Notice: Subject to any disclaimer, the term of this patent is extended or adjusted under 35 U.S.C. 154(b) by 889 days.

(21) Appl. No.: 10/560,331

(22) PCT Filed: Jun. 9, 2004

(86) PCT No.: PCT/JP2004/008420

§ 371 (c)(1), (2), (4) Date: Aug. 9, 2006

(87) PCT Pub. No.: WO2004/112394

PCT Pub. Date: Dec. 23, 2004

(65) Prior Publication Data

US 2006/0280479 A1    Dec. 14, 2006

(30) Foreign Application Priority Data

Jun. 11, 2003 (JP) .............................. 2003-167125
Jul. 25, 2003 (JP) .............................. 2003-280472

(51) Int. Cl.
*H04N 5/00* (2006.01)
*H04N 5/91* (2006.01)
*H04N 7/00* (2006.01)
*H04N 7/26* (2006.01)

(52) U.S. Cl. .................. 386/126; 386/46; 386/124; 386/125

(58) Field of Classification Search .............. 386/1, 386/46, 95, 124–126, 68, 83, 85
See application file for complete search history.

(56) References Cited

U.S. PATENT DOCUMENTS 5,559,608 A    9/1996    Kunihiro et al.

(Continued)

FOREIGN PATENT DOCUMENTS

EP    0 676 758    10/1995

(Continued)

OTHER PUBLICATIONS

Japanese Office Action for corresponding Application No. 2003-280472 dated Mar. 10, 2006.

(Continued)

*Primary Examiner*—Marsha D Banks Harold
*Assistant Examiner*—Marc Dazenski
(74) *Attorney, Agent, or Firm*—Renner, Otto, Boisselle & Sklar, LLP

(57) ABSTRACT

The recording apparatus of the present invention includes: a file generating section for receiving video data and audio data and generating a video data file and an audio data file; a dividing section for dividing the video data file into a plurality of video data elements and dividing the audio data file into a plurality of audio data elements, an arranging section for arranging data such that the video data elements and the audio data elements are recorded within a predetermined recording unit; and a recording section for recording the arranged data on an information recording medium.

83 Claims, 18 Drawing Sheets

U.S. PATENT DOCUMENTS

| | | | |
|---|---|---|---|
| 6,636,687 B1 | 10/2003 | Ando et al. | |
| 7,457,523 B2 * | 11/2008 | Ando et al. | 386/95 |
| 2002/0061180 A1 | 5/2002 | Nakamura et al. | |
| 2003/0115219 A1 * | 6/2003 | Chadwick | 707/200 |
| 2008/0317443 A1 * | 12/2008 | Ando et al. | 386/126 |

FOREIGN PATENT DOCUMENTS

| | | |
|---|---|---|
| EP | 0 752 703 | 1/1997 |
| JP | 05-109198 | 4/1993 |
| JP | 10-275425 | 10/1998 |
| JP | 11-088827 A | 3/1999 |
| JP | 11-250629 A | 9/1999 |
| JP | 2000-358211 | 12/2000 |
| JP | 2001-061144 | 3/2001 |
| JP | 2002-058025 | 2/2002 |
| JP | 2003-32632 A | 1/2003 |

OTHER PUBLICATIONS

International Search Report for corresponding Application No. PCT/JP2004/008420 mailed Sep. 28, 2004.

European Search Report for corresponding Application No. 04745962.3 dated Apr. 21, 2006.

Japanese Office Action for corresponding Application No. 2003-280472 dated Oct. 31, 2005.

* cited by examiner

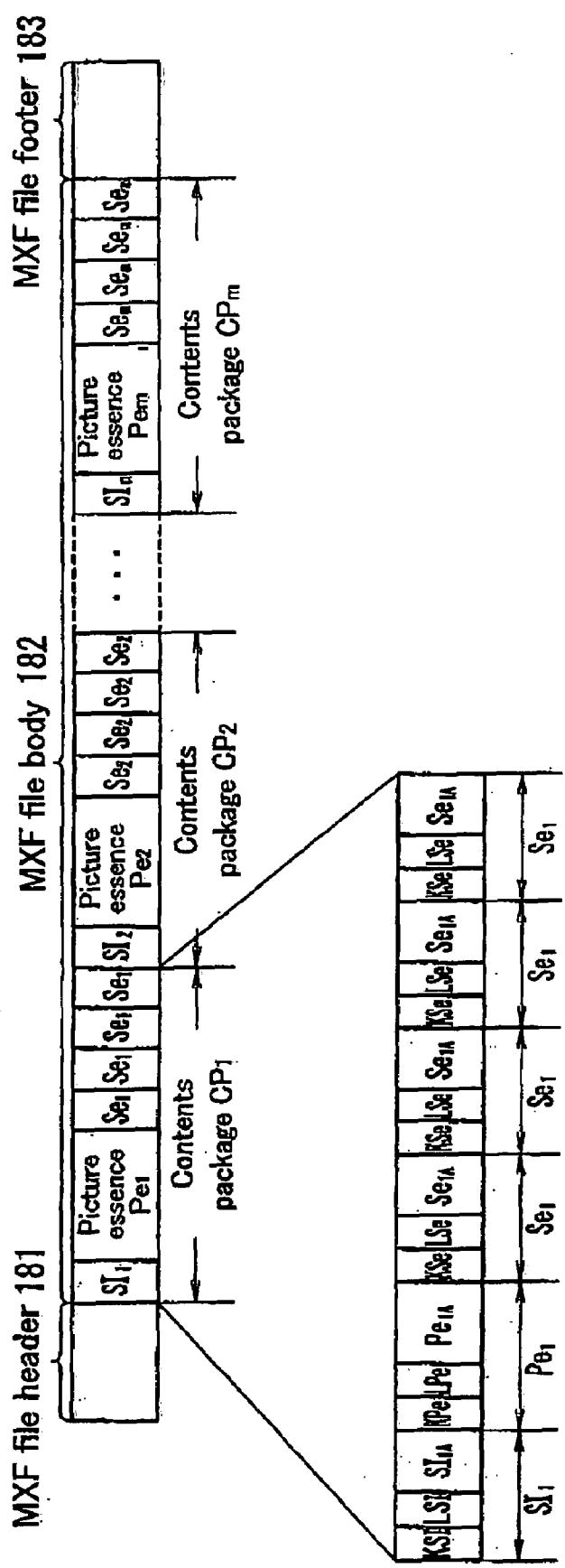

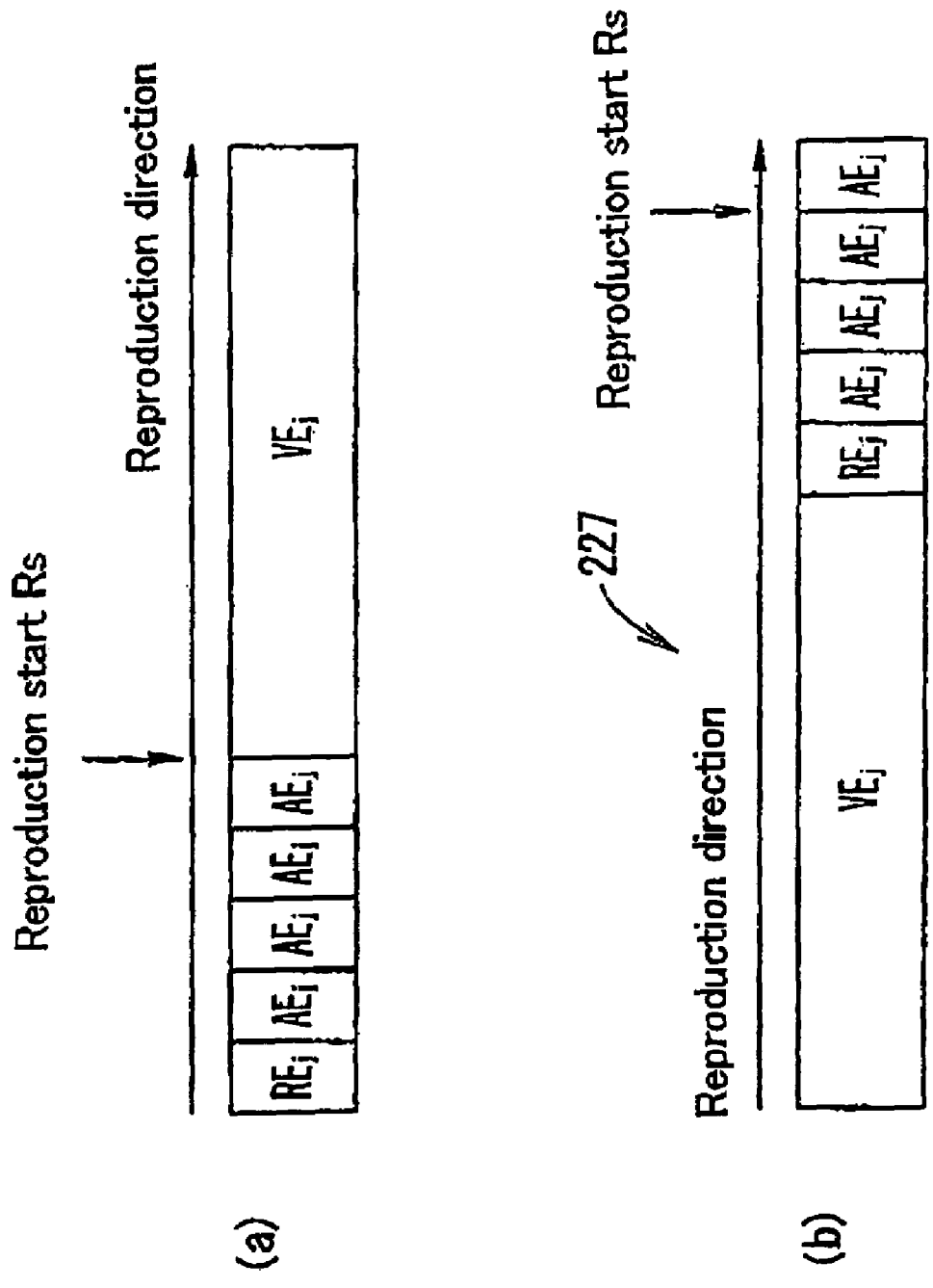

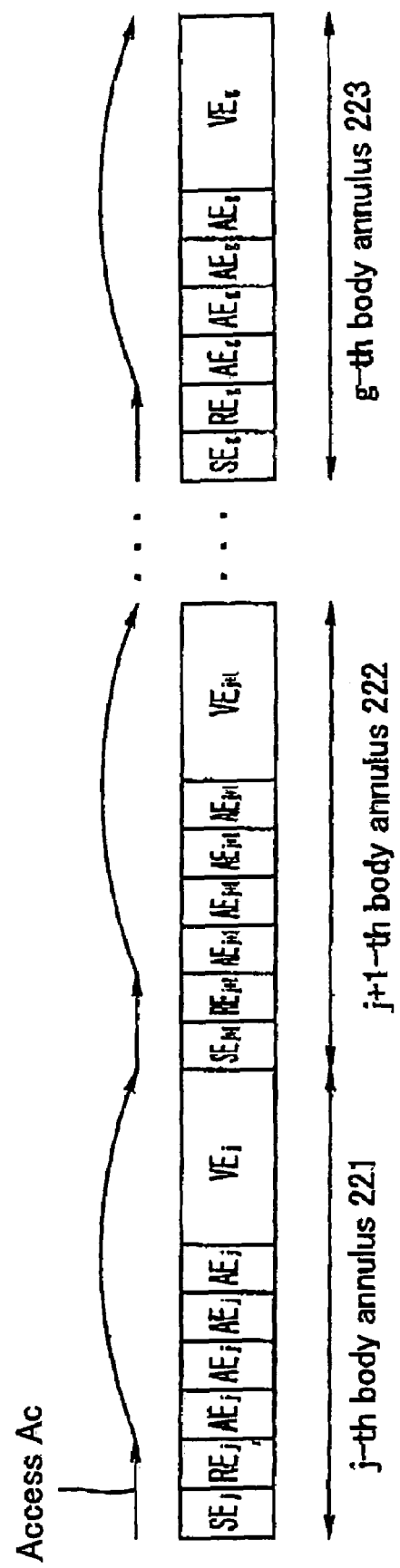

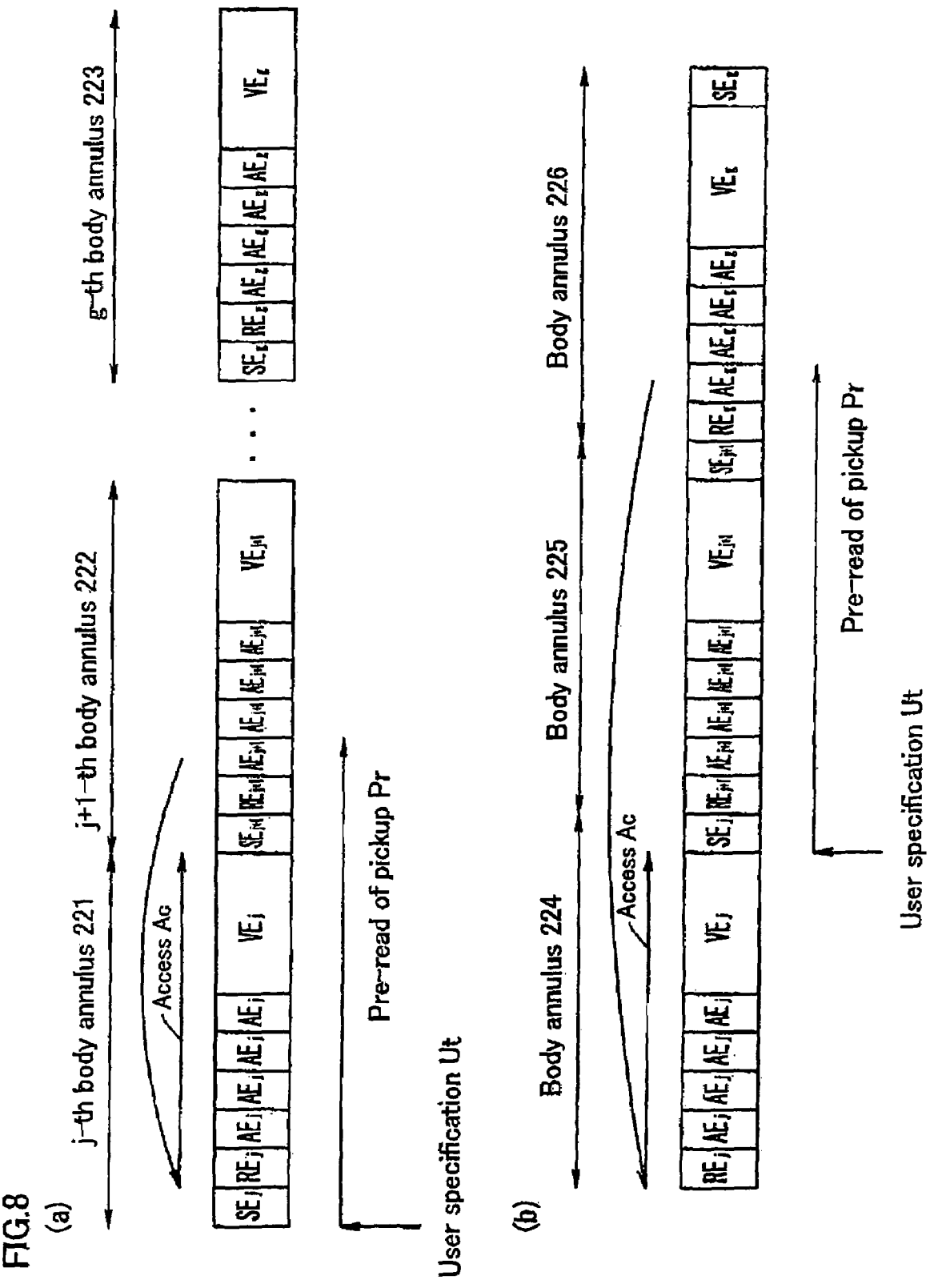

RECORDING DEVICE, INFORMATION RECORDING MEDIUM AND RECORDING METHOD

TECHNICAL FIELD

The present invention relates to a recording apparatus and a recording method for recording video data and audio data on an information recording medium, and an information recording medium on which video data and audio data are recorded.

BACKGROUND ART

There is an apparatus for recording video data and audio data on an information recording medium such as an optical disc and for editing the recorded video data and the recorded audio data (For example, see Reference 1). In such an apparatus, it is desirable that video data and audio data are recorded on the information recording medium such that editing and reproduction operations can be performed at a high speed.

Reference 1: Japanese Laid-Open Patent Publication No. 11-88827

Further, although not described in Reference 1. it is desirable that data other than video data and audio data (e.g. auxiliary data, metadata or the like), which are related to the video data and the audio data, are recorded on the information recording medium such that editing and reproduction operations can be performed at a high speed.

The object of the present invention is to provide a recording apparatus and a recording method for recording video data, audio data and data other than these data (e.g. auxiliary data, metadata or the like), which are related to each other, such that editing and reproduction operations can be performed at a high speed, and an information recording medium on which these related data are recorded.

DISCLOSURE OF THE INVENTION

A recording apparatus of the present invention includes: a file generating section for receiving video data including a plurality of video unit data each representing a video and audio data related to the video data, generating a video data file by providing a plurality of video specific data to the plurality of video unit data, the plurality of video specific data for identifying the plurality of video unit data, and generating an audio data file by providing audio specific data to the audio data, the audio specific data for identifying the audio data; a dividing section for receiving the video data file and the audio data file, dividing the video data file into a plurality of video data elements, and dividing the audio data file into a plurality of audio data elements related to the plurality of video data elements, wherein an i-th (i is an integer) video data element of the plurality of video data elements includes a predetermined number of video unit data of the plurality of video unit data; an arranging section for arranging the i-th video data element and an i-th audio data element related to the i-th video data element among the plurality of audio data elements such that the i-th audio data element and the i-th video data element are recorded within a predetermined recording unit; and a recording section for recording the arranged i-th video data element and the arranged i-th audio data element on an information recording medium. Thereby, the object described above can be achieved.

An I-th (I is an integer) video specific data for identifying the I-th video unit data of the plurality of video unit data among the plurality of video specific data may be provided to the I-th video unit data, and the file generating section may provide filler data and filler data specific data to the I-th video unit data, the filler data specific data for identifying the filler data, and a total size of the sum of the I-th video unit data, the I-th video specific data, the filler data and the filler data specific data may be equal to an integer multiple the size of a sector unit of the information recording medium.

A header area may be provided on the information recording medium, and the arranging section may output the audio specific data to the recording section such that the audio specific data is recorded in the header area.

The file generating section may further receive metadata related to the video data and the audio data, and further generate a metadata file by providing metadata specific data to the metadata, the metadata specific data for identifying the metadata, the dividing section may divide the metadata file into a plurality of metadata elements related to the plurality of video data elements, and the arranging section may arrange an i-th metadata element related to the i-th video data element among the plurality of metadata elements and the i-th audio data element such that they are arranged ahead of the i-th video data element within the predetermined recording unit.

The file generating section may further receive auxiliary data including compressed video data which has been compressed at a higher compressibility than the video data, further generate an auxiliary data file by providing auxiliary data specific data to the auxiliary data, the auxiliary data specific data for identifying the auxiliary data, the dividing section may divide the auxiliary data file into a plurality of auxiliary data elements related to the plurality of video data elements, and the arranging section may arrange an i-th auxiliary data element related to the i-th video data element among the plurality of auxiliary data elements and the i-th metadata element such that they are adjacent to each other within the predetermined recording unit.

The i-th auxiliary data element may further include compressed audio data which has been compressed at a higher compressibility than the video unit data.

The arranging section may arrange the i-th auxiliary data element ahead of the i-th video data element.

The arranging section may arrange the auxiliary data element ahead of the metadata element, the audio data element and the video data element.

The file generating section may further receive auxiliary data including compressed video data which has been compressed at a higher compressibility than the video data, and further generate an auxiliary data file by providing auxiliary data specific data to the auxiliary data, the auxiliary data specific data for identifying the auxiliary data, the dividing section may divide the auxiliary data file into a plurality of auxiliary data elements related to the plurality of video data elements, an i-th auxiliary data element of the plurality of auxiliary data elements is related to the i-th video data element, the dividing section may specify a position in the video data file corresponding to a head of the i-th auxiliary data element, and the dividing section may divide the video data file such that a position, which is ahead of the specified position and which is spaced from the specified position by an integer multiple the size of an ECC block unit of the information recording medium, is a head of the i-th video data element.

The file generating section may further receive metadata related to the video data and the audio data, and further generate a metadata file by providing metadata specific data to the metadata, the metadata specific data for identifying the metadata, the dividing section may divide the metadata file into a plurality of metadata elements related to the plurality of video data elements, an i-th metadata element of the plurality of metadata elements is related to the i-th video data element, the dividing section may specify a position in the metadata file corresponding to a head of the i-th video data element, and the dividing section may divide the metadata file such that a position, which is behind the specified position and which is spaced from the specified position by an integer multiple the size of an ECC block unit of the information recording medium, is a head of the i-th metadata element.

The dividing section may specify a position in the audio data file corresponding to a head of the i-th video data element, and the dividing section may divide the audio data file such that a position, which is behind the specified position and which is spaced from the specified position by an integer multiple the size of the ECC block unit of the information recording medium, is a head of the i-th audio data element.

When there exists a defective area on the information recording medium, the arranging section may arrange rearrangement data for forming a rearrangement area used to rearrange predetermined data depending on the defective area, as well as the i-th video data element and the i-th audio data element, such that the rearrangement data is recorded within the predetermined recording unit.

When there exists a defective area on the information recording medium, the arranging section may arrange shift data for forming a shift area used to shift predetermined data depending on the defective area, as well as the i-th video data element and the i-th audio data element, such that the shift data is recorded within the predetermined recording unit.

An information recording medium of the present invention includes: video unit data representing a video; video specific data for identifying the video unit data; filler data provided to the video unit data; and filler data specific data for identifying the filler data, wherein a total size of the sum of the video unit data, the video specific data, the filler data and the filler data specific data is equal to an integer multiple the size of a sector unit of the information recording medium. Thereby, the object described above can be achieved.

An information recording medium of the present invention is an information recording medium on which a header area is provided, including: audio data; and audio specific data for identifying the audio data, wherein the audio specific data is recorded in the header area. Thereby, the object described above can be achieved.

An information recording medium of the present invention includes: a video data element including video unit data representing a video; a metadata element related to the video data element; and an audio data element related to the video data element, wherein the metadata element and the audio data element are arranged ahead of the video data element within a predetermined recording unit. Thereby, the object described above can be achieved.

The information recording medium may further include an auxiliary data element including compressed video data which has been compressed at a higher compressibility than the video unit data, the auxiliary data element being related to the video data element, and the metadata element and the auxiliary data element may be arranged such that they are adjacent to each other within the predetermined recording unit.

The auxiliary data element may further include compressed audio data which has been compressed at a higher compressibility than the video unit data.

The auxiliary data element may be arranged ahead of the video data element.

The auxiliary data element may be arranged ahead of the metadata element, the audio data element and the video data element.

An information recording medium of the present invention includes: a plurality of video data elements obtained by dividing a video data file including a plurality of video unit data, each of the plurality of video unit data representing a video; and a plurality of auxiliary data elements, each of the plurality of auxiliary data elements including compressed video data which has been compressed at a higher compressibility than the plurality of video unit data, the plurality of auxiliary data elements being related to the plurality of video data elements, wherein an i-th (i is an integer) video data element of the plurality of video data elements is related to an i-th auxiliary data element of the plurality of auxiliary data elements, and a position in the video data file, which is ahead of a predetermined position corresponding to a head of the i-th auxiliary data element and which is spaced from the predetermined position by an integer multiple the size of an ECC block unit of the information recording medium, is a head of the i-th video data element. Thereby, the object described above can be achieved.

An information recording medium of the present invention includes: a plurality of video data elements including video data; and a plurality of metadata elements obtained by dividing a metadata file including metadata related to the video data; wherein an i-th (i is an integer) video data element of the plurality of video data elements is related to an i-th metadata element of the plurality of metadata elements, and a position in the metadata file, which is behind a predetermined position corresponding to a head of the i-th video data element and which is spaced from the predetermined position by an integer multiple the size of an ECC block unit of the information recording medium, is a head of the i-th metadata element. Thereby, the object described above can be achieved.

An information recording medium of the present invention includes: a plurality of video data elements including video data; and a plurality of audio data elements obtained by dividing an audio data file including audio data related to the video data, wherein an i-th (i is an integer) video data element of the plurality of video data elements is related to an i-th audio data element of the plurality of audio data elements, a position in the audio data file, which is behind a predetermined position corresponding to a head of the i-th video data element and which is spaced from the predetermined position by an integer multiple the size of an ECC block unit of the information recording medium, is ahead of the i-th audio data element. Thereby, the object described above can be achieved.

An information recording medium of the present invention includes: a video data element including a plurality of video unit data, each of the plurality of video unit data representing a video; and an audio data element related to the video data element, wherein the information recording medium further comprises a rearrangement area, when there exists a defective area on the information recording medium, the rearrangement area is used to rearrange predetermined data depending on the defective area.

An information recording medium of the present invention includes: a video data element including a plurality of video unit data, each of the plurality of video unit data representing a video; and an audio data element related to the video data element, wherein the information recording medium further comprises a shift area, when there exists a defective area on the information recording medium, the shift area is used to shift predetermined data depending on the defective area.

The predetermined data may be the video data element.

A recording method of the present invention includes the step of: receiving video data including a plurality of video unit data each representing a video and audio data related to the video data, generating a video data file by providing a plurality of video specific data to the plurality of video unit data, the plurality of video specific data for identifying the plurality of video unit data, and generating an audio data file by providing audio specific data to the audio data, the audio specific data for identifying the audio data; receiving the video data file and the audio data file, dividing the video data file into a plurality of video data elements, and dividing the audio data file into a plurality of audio data elements related to the plurality of video data elements, wherein an i-th (i is an integer) video data element of the plurality of video data elements includes a predetermined number of video unit data of the plurality of video unit data; arranging the i-th video data element and an i-th audio data element related to the i-th video data element among the plurality of audio data elements such that the i-th audio data element and the i-th video data element are recorded within a predetermined recording unit; and recording the arranged i-th video data element and the arranged i-th audio data element on an information recording medium. Thereby, the object described above can be achieved.

An I-th (I is an integer) video specific data for identifying the I-th video unit data of the plurality of video unit data among the plurality of video specific data may be provided to the I-th video unit data, and the file generating step may include a step of providing filler data and filler data specific data to the I-th video unit data, the filler data specific data for identifying the filler data, and a total size of the sum of the I-th video unit data, the I-th video specific data, the filler data and the filler data specific data may be equal to an integer multiple the size of a sector unit of the information recording medium.

A header area may be provided on the information recording medium, and the arranging step may include a step of outputting the audio specific data to the recording section such that the audio specific data is recorded in the header area.

The step file generating step may include a step of further receiving metadata related to the video data and the audio data, and further generating a metadata file by providing metadata specific data to the metadata, the metadata specific data for identifying the metadata, the dividing step may include a step of dividing the metadata file into a plurality of metadata elements related to the plurality of video data elements, and the arranging step may include a step of arranging an i-th metadata element related to the i-th video data element among the plurality of metadata elements and the i-th audio data element such that they are arranged ahead of the i-th video data element within the predetermined recording unit.

The file generating step may include a step of further receiving auxiliary data including compressed video data which has been compressed at a higher compressibility than the video data, further generating an auxiliary data file by providing auxiliary data specific data to the auxiliary data, the auxiliary data specific data for identifying the auxiliary data, the dividing step may include a step of dividing the auxiliary data file into a plurality of auxiliary data elements related to the plurality of video data elements, and the arranging step may include a step of arranging an i-th auxiliary data element related to the i-th video data element among the plurality of auxiliary data elements and the i-th metadata element such that they are adjacent to each other within the predetermined recording unit.

The i-th auxiliary data element may further include compressed audio data which has been compressed at a higher compressibility than the video unit data.

The arranging step may include a step of arranging the L-th auxiliary data element ahead of the L-th video data element.

The arranging step may include a step of arranging the auxiliary data element ahead of the metadata element, the audio data element and the video data element.

The file generating step may include a step of further receiving auxiliary data including compressed video data which has been compressed at a higher compressibility than the video data, and further generating an auxiliary data file by providing auxiliary data specific data to the auxiliary data, the auxiliary data specific data for identifying the auxiliary data, the dividing step may include a step of dividing the auxiliary data file into a plurality of auxiliary data elements related to the plurality of video data elements, an i-th auxiliary data element of the plurality of auxiliary data elements is related to the i-th video data element, the dividing step includes a step of specifying a position in the video data file corresponding to a head of the i-th auxiliary data element, and the dividing step may include a step of dividing the video data file such that apposition, which is ahead of the specified position and which is spaced from the specified position by an integer multiple the size of an ECC block unit of the information recording medium, is a head of the i-th video data element.

The file generating step may include a step of further receiving metadata related to the video data and the audio data, and further generating a metadata file by providing metadata specific data to the metadata, the metadata specific data for identifying the metadata, the dividing step may include a step of dividing the metadata file into a plurality of metadata elements related to the plurality of video data elements, an i-th metadata element of the plurality of metadata elements is related to the i-th video data element, the dividing step may include a step of specifying a position in the metadata file corresponding to a head of the i-th video data element, and the dividing step may include a step of dividing the metadata file such that a position, which to behind the specified position and which is spaced from the specified position by an integer multiple the size of an ECC block unit of the information recording medium, is a head of the i-th metadata element.

The dividing step may include a step of specifying a position in the audio data file corresponding to a head of the i-th video data element, and the dividing step may include a step of dividing the audio data file such that a position, which is behind the specified position and which is spaced from the specified position by an integer multiple the size of the ECC block unit of the information recording medium, is a head of the i-th audio data element.

When there exists a defective area on the information recording medium, the arranging step may further include a step of arranging rearrangement data for forming a rearrangement area used to rearrange predetermined data depending on the defective area, as well as the i-th video data element and the i-th audio data element, such that the rearrangement data is recorded within the predetermined recording unit.

When there exists a defective area on the information recording medium, the arranging step may further include a step of arranging shift data for forming a shift area used to shift predetermined data depending on the defective area, as well as the i-th video data element and the i-th audio data element, such that the shift data is recorded within the predetermined recording unit.

A recording apparatus of the present invention includes: a file generating section for receiving a first contents data including a plurality of contents unit data each representing at least a part of first contents and a second contents data related to the first contents data, generating a first contents data file by providing a plurality of first contents specific data to the plurality of the contents unit data, the plurality of first contents specific data for identifying the plurality of contents unit data, and generating a second contents data file by providing second contents specific data to the second contents data, the second contents specific data for identifying the second contents data; a dividing section for receiving the first contents data file and the second contents data file, dividing the first contents data file into a plurality of first contents data elements, and dividing the second contents data file into a plurality of second contents data elements related to the plurality of first contents data element, wherein an i-th (i is an integer) first contents data element of the plurality of first contents data elements includes a predetermined number of contents unit data of the plurality of contents unit data; an arranging section for arranging the i-th first contents data element and an i-th second contents data element related to the i-th first contents data element among the plurality of the second contents data elements such that the i-th second contents data element and the i-th first contents data element are recorded within a predetermined recording unit; and a recording section for recording the arranged I-th first contents data element and the arranged i-th second contents data element on the information recording medium. Thereby, the object described above can be achieved.

An I-th (I is an integer) first contents specific data for identifying the I-th contents unit data of the plurality of contents unit data among the plurality of first contents specific data may be provided to the I-th contents unit data, the file generating section may provide filler data and filler data specific data to the I-th contents unit data, the filler data specific data for identifying the filler data, and a total size of the sum of the I-th contents unit data, the I-th first contents specific data, the filler data and the filler data specific data may be equal to an integer multiple the size of a sector unit of the information recording medium.

The first contents may be one of a video and an audio.

The I-th first contents specific data may include first key data which identifies a type of the I-th contents unit data and first length data which indicates a length of the I-th contents unit data, and the filler data specific data may include second key data which identifies a type of the filler data and second length data which indicates a length of the filler data.

The first contents may be one of a video and an audio.

A header area may be provided on the information recording medium, and the arranging section may output the second contents specific data to the recording section such that the second contents specific data is recorded in the header area.

The second content may be one of a video and an audio.

The second contents specific data may include key data which identifies a type of the second contents data and length data which indicates a length of the second contents data.

The second contents may be one of a video and an audio.

An information recording medium of the present invention includes: contents unit data representing at least a part of contents; contents specific data for identifying the contents unit data; filler data provided to the contents unit data; and filler data specific data for identifying the filler data, wherein a total size of the sum of the contents unit data, the contents specific data, the filler data and the filler data specific data is equal to an integer multiple the size of a sector unit of the information recording medium. Thereby, the object described above can be achieved.

The contents may be one of a video and an audio.

The contents specific data may include first key data which identifies a type of the contents unit data and first length data which indicates a length of the contents unit data, and the filler data specific data may include second key data which identifies a type of the filler data and second length data which indicates a length of the filler data.

The contents may be one of a video and an audio.

An information recording medium of the present invention is an information recording medium on which a header area is provided, including: contents data representing at least a part of contents; and contents specific data for identifying the contents data, wherein the contents specific data is recorded in the header area. Thereby, the object described above can be achieved.

The contents may be one of a video and an audio.

The contents specific data may include key data which identifies a type of the contents data and length data which indicates a length of the contents data.

The contents may be one of a video and an audio.

A recording method of the present invention includes the steps of: receiving a first contents data including a plurality of contents unit data each representing at least a part of first contents and a second contents data related to the first contents data, generating a first contents data file by providing a plurality of first contents specific data to the plurality of the contents unit data, the plurality of first contents specific data for identifying the plurality of contents unit data, and generating a second contents data file by providing second contents specific data to the second contents data, the second contents specific data for identifying the second contents data; receiving the first contents data file and the second contents data file, dividing the first contents data file into a plurality of first contents data elements, and dividing the second contents data file into a plurality of second contents data elements related to the plurality of first contents data element, wherein an i-th (i is an integer) first contents data element of the plurality of first contents data elements includes a predetermined number of contents unit data of the plurality of contents unit data; arranging the i-th first contents data element and an i-th second contents data element related to the i-th first contents data element among the plurality of the second contents data elements such that the i-th second contents data element and the i-th first contents data element are recorded within a predetermined recording unit; and recording the arranged i-th first contents data element and the arranged i-th second contents data element on the information recording medium. Thereby, the object described above can be achieved.

An I-th (I is an integer) first contents specific data for identifying the I-th contents unit data of the plurality of contents unit data among the plurality of first contents specific data may be provided to the I-th contents unit data, the file generating step may include a step of providing filler data and filler data specific data to the I-th contents unit data, the filler data specific data for identifying the filler data, and a total size of the sum of the I-th contents unit data, the I-th first contents specific data, the filler data and the filler data specific data may be equal to an integer multiple the size of a sector unit of the information recording medium.

The first contents may be one of a video and an audio.

The I-th first contents specific data may include first key data which identifies a type of the I-th contents unit data and first length data which indicates a length of the I-th contents unit data, and the filler data specific data may include second key data which identifies a type of the filler data and second length data which indicates a length of the filler data.

The first contents may be one of a video and an audio.

A header area may be provided on the information recording medium, and the arranging step may include a step of outputting the second contents specific data to the recording section such that the second contents specific data is recorded in the header area.

The second content may be one of a video and an audio.

The second contents specific data may include key data which identifies a type of the second contents data and length data which indicates a length of the second contents data.

The second contents may be one of a video and an audio.

According to the recording apparatus, the information recording medium and the recording method of the present invention, a total size of the sum of the video unit data, the video specific data, the filler data and the filler data specific data is equal to an integer multiple the size of a sector unit of the information recording medium. This makes it possible to access a frame to be edited at a high speed when a user performs editing such as partial deletion of a video. As a result, the editing can be performed at a high speed.

Further, according to the recording apparatus, the information recording medium and the recording method of the present invention, the metadata element and the audio data element are arranged ahead of the video data element within a predetermined recording unit. Further, the metadata element and the auxiliary data element are arranged such that they are adjacent to each other in the predetermined recording unit. Further, the auxiliary data element is arranged ahead of the metadata element, the audio data element and the video data element. According to the data arrangement of the present invention, it is possible to perform a high speed reproduction operation including a high speed search.

BRIEF DESCRIPTION OF THE DRAWINGS

FIG. 2C is a drawing for showing an auxiliary AV data file 113.

FIG. 6(a) is a drawing for showing the j-th body annulus 221.

FIG. 6(b) is a drawing for showing the body annulus 22.7 for comparison.

FIG. 7 is a drawing for showing an access procedure of the pickup for reading the auxiliary AV data element $SE_j$ and the real time metadata element $RE_j$ from the body annuluses.

FIG. 8 is a drawing for describing a procedure for starting the reproduction of data from a high speed search.

BEST MODE FOR CARRYING OUT THE INVENTION

Hereinafter, embodiments of the present invention will be described with reference to attached drawings.

Figure 1:
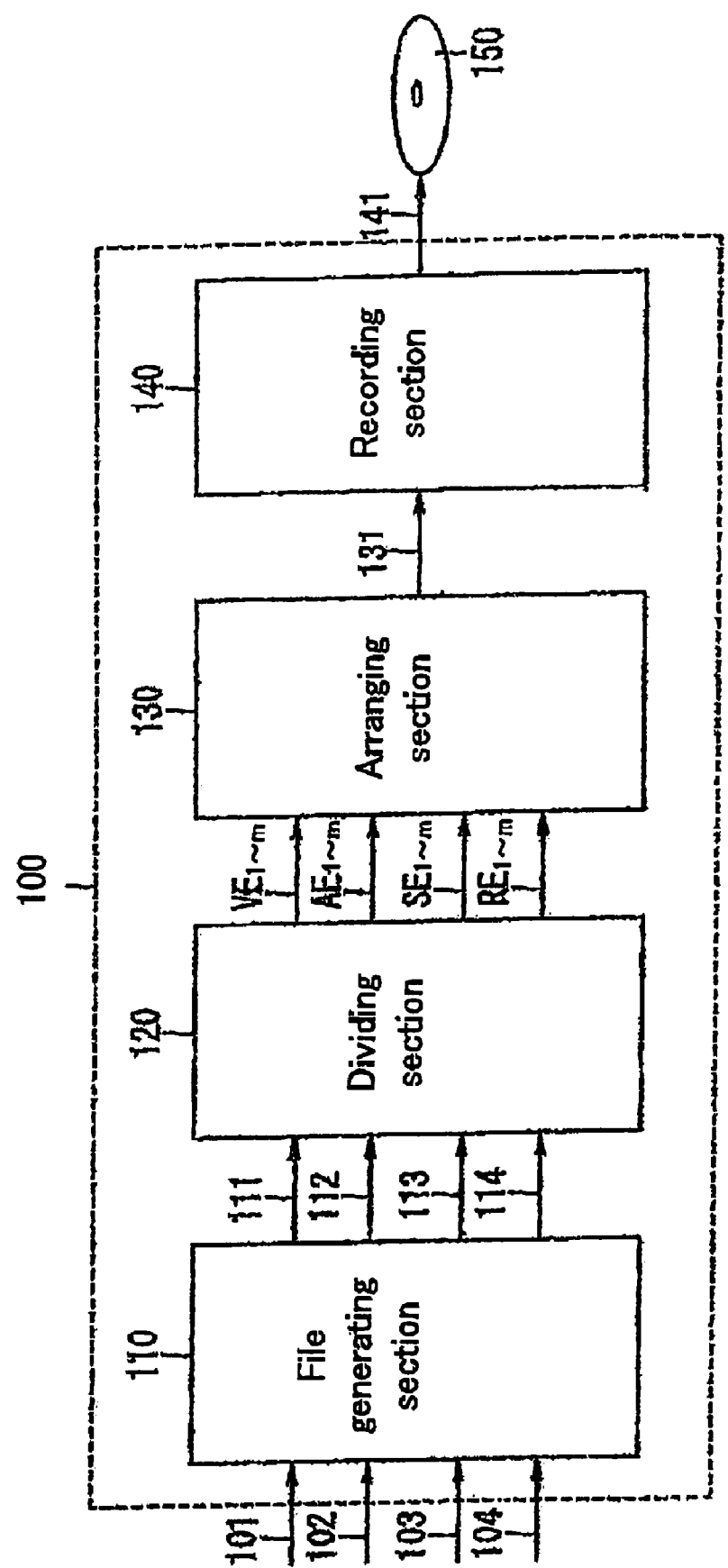
FIG. 1 is a drawing for showing a recording apparatus 100 according to an embodiment of the present invention.

FIG. 1 shows a recording apparatus 100 according to an embodiment of the present invention.

The recording apparatus 100 includes a file generating section 110 for receiving video data 101 and audio data 102 and generating a video data file 111 and an audio data file 112; a dividing section 120 for dividing the video data file 111 into a plurality of video data elements $VE_1$ to $VE_m$ (m is an integer) and dividing the audio data file 112 into a plurality of audio data elements $AE_1$ to $AE_m$; an arranging section 130 for generating arrangement data 131 in which the video data element and the audio data element related to the video data element are arranged such that they are recorded within a predetermined recording unit; and a recording section 140 for recording the arrangement data 131 on an information recording medium 150. The information recording medium 150 is, for example, an optical disc medium.

The file generating section 110 receives video data 101, audio data 102, auxiliary AV data 103 and real time metadata 104.

The video data 101 represents one scene (video contents) of a video taken by a camera. One scene of a video is referred to as a series of images taken during a period from the time when a recording button of the camera is pushed to the time when a recording stop button of the camera is pushed. The video data 101 includes a plurality of video unit data $VU_1$-$VU_n$ (n is an integer).

The audio data 102 represents sound (audio contents) related to one scene of the video. The auxiliary AV data 103 includes a pair of video data and audio data which have been compressed at a higher compressibility than the video data 101. Real time metadata 104 represents additional information of the video data 101 and the audio data 102 (e.g. time code, UMID). The UMID will be described later.

The video data file 111 will be described below. The file generating section 110 (FIG. 1) receives the video data 101 including a plurality of video unit data $VU_1$-$VU_n$ and generates the video data file 111.

Figure 2A:
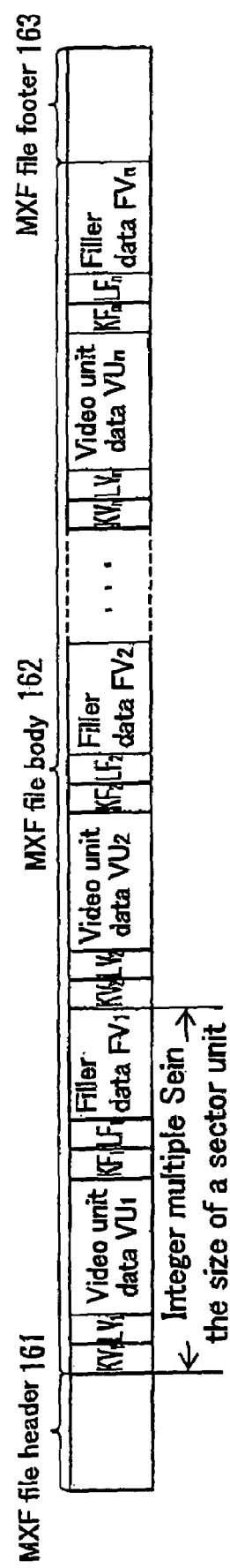
FIG. 2A is a drawing for showing a video data file 111.

FIG. 2A shows the video data file 111. A format of the video data file 111 shown in FIG. 2A is referred to as MXF (Material Exchange Format). Herein, the MXF standard is equivalent to SMPTE 377M. A format of the plurality of unit data $VU_1$-$VU_n$ is, for example, D10.

The video data file 111 includes an MXF file header 161, an MXF file body 162 and an MXF file footer 163. Each data size of the MXF file header 161, the MXF file body 162 and the MXF file footer 163 is, for example, is an integer multiple of 65536 bytes. The MXF file header 161 and the MXF file footer 163 include specific data of the MXF file body 162.

The MXF file body 162 will be described. Video unit data $VU_1$-$VU_n$ each represent a value of a picture item. The file generating section 110 (FIG. 1) provides key data $KV_1$-$KV_n$ and length data $LV_1$-$LV_n$ to the plurality of video unit data $VU_1$-$VU_n$, respectively (The KLV coded video essence is obtained in the frame lapping form). The key data $KV_1$-$KV_n$ and the length data $LV_1$-$LV_n$ are video specific data. The key data $KV_1$-$KV_n$ are data for identifying types of the plurality of video unit data $VU_1$-$VU_n$ (picture items). The length data $LV_1$-$LV_n$ represent lengths of the plurality of the video unit data $VU_1$-$VU_n$ (picture items).

The file generating section 110 provides filler data $FV_1$-$FV_n$ to the plurality of video unit data $VU_1$-$VU_n$, respectively. Filler data represents a filler item.

The file generating section 110 (FIG. 1) provides key data $KF_1$-$KF_n$ and length data $LF_1$-$LF_n$ to the plurality of filler data $FV_1$ to $FV_n$, respectively. The key data $KF_1$-$KF_n$ and the length data $LF_1$-$LF_n$ are specific data of the filler data The key data $KF_1$-$KF_n$ are data for identifying the plurality of filler data $FV_1$-$FV_n$ (filler items). The length data $LF_1$-$LF_n$ represent lengths of the plurality of filler data $FV_1$-$FV_n$ (filler items).

The total size of the sum of video unit data $VU_i$, key data $KV_i$, length data $LV_i$, filler data $FV_i$, key data $KF_i$ and length data $LF_i$ is equal to a size $S_{ein}$ which is an integer multiple the size of a sector unit of the information recording medium 150 (FIG. 1) (e.g. an integer multiple of 2048 bytes), where i is an integer satisfying $1 \leq i \leq n$. The filler data $FV_i$ is filler data provided to the video unit data $VU_i$ for adjusting the total size of the sum such that the total size of the sum is equal to an integer multiple the size of a sector unit. For example, when a format of the video unit data $Vu_i$ is a DV-Picture, a VAUX data item and a specific data of the VAUX data is provided to the video unit data $VU_i$. Further, when the format is MPEG-Long GOP, the length of the video unit data $VU_i$ for each frame is varied, however, a size of the filler data $FV_i$ is set such that the total size of the sum of the video unit data $VU_i$ and the plurality types of data related to the video unit data $VU_i$ described above is equal to an integer multiple the size of a sector unit.

The audio data file 112 will be described below. The file generating section 110 (FIG. 1) receives the audio data 102 and generates the audio data file 112.

Figure 2B:
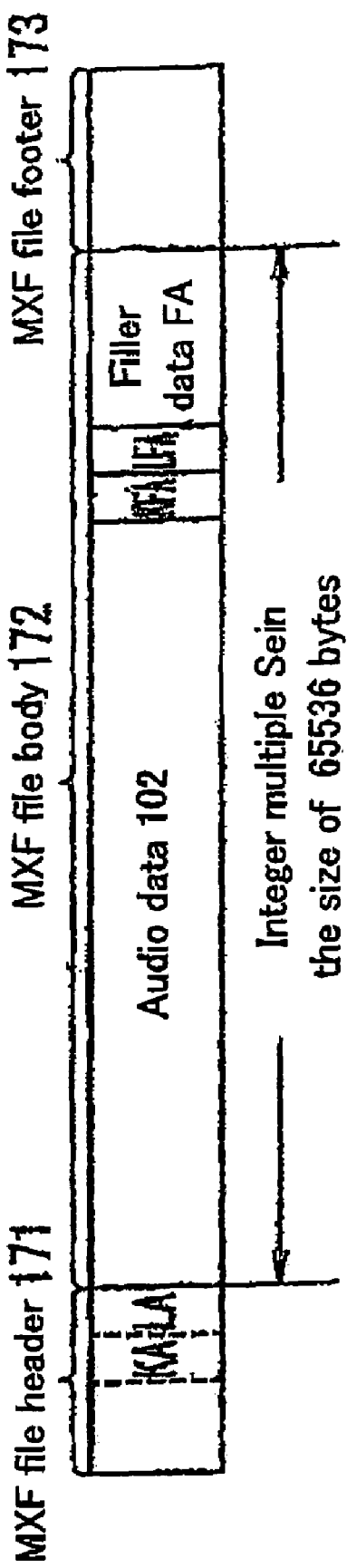
FIG. 2B is a drawing for showing an audio data file 112.

FIG. 2B shows the audio data file 112. A format of the audio data file 112 shown in FIG. 2B is referred to as MXF. A format of audio data 102 is, for example, LPCM.

The audio data file 112 includes an MXF file header 171, an MXF file body 172 and an MXF file footer 173. Each data size of the MXF file header 171, the MXF file body 172 and the MXF file footer 173 is, for example, an integer multiple of 65536 bytes. The MXF file header 171 and the MXF file footer 173 include specific data of the MXF file body 172.

The file generating section 110 (FIG. 1) provides key data KA and length data LA to the audio data 102 (The audio essence which has been KLV coded in the whole clip is obtained in the clip lapping form). The key data KA and the length data LA are audio specific data. The key data KA is data for identifying the audio data 102 (sound item). The length data LA represents a length of the audio data 102 (sound item). The key data KA and the length data LA are not included in the MXF file body 172, but are included in the MXF file header 171.

The file generating section 110 (FIG. 1) provides filler data FA to the audio data 102.

The file generating section 110 provides key data KFA and length data LFA to the filler data FA. The key data KFA and the length data LFA are specific data of the filler data. The key data KFA is data for identifying the filler data FA. The length data LFA represents a length of the filler data FA.

The total size of the sum of the audio data 102, the filler data FA and the key data KFA and the length data LFA is, for example, a size $SE_{in}$ which is an integer multiple of 65536 bytes. In this case, the filler data FA is filler data provided to the audio data 102 for adjusting the total size of the sum such that the total size of the sum is equal to an integer multiple of 65536 bytes.

Further, the audio data file 112 shown in FIG. 2B is a audio data file for one channel. The file generating section 110 receives audio data 102 for a plurality of channels, and generates the audio data file 112 for the plurality of channels.

The auxiliary AV data file 113 will be described below. The file generating section 110 (FIG. 1) receives the auxiliary AV data 103 including a plurality of contents packages $CP_1$-$CP_m$ (m is an integer), and generates the auxiliary AV data file 113.

FIG. 2C shows the auxiliary AV data file 113. A format of the auxiliary AV data file 113 shown in FIG. 2C is referred to as MXF.

The auxiliary AV data file 113 includes an MXF file header 181, an MXF file body 182 and an MXF file footer 183. Each data size of the MXF file header 181, the MXF file body 182 and the MXF file footer 183 is, for example, an integer multiple of 65536 bytes. The MXF file header 181 and the MXF file footer 183 include specific data of the MXF file body 182.

The MXF file body 182 will be described below. The file generating section 110 (FIG. 1) provides key data and length data to an item included in the plurality of contents packages $CP_1$-$CP_m$. The key data and the length data are specific data. For example, regarding the contents package $CP_1$, a system item $SI_1$ is generated by providing key data KSI and length data LSI to a system item $SI_{1A}$ included in the auxiliary AV data 103. Further, picture essence $Pe_1$ is generated by providing key data KPe and length data LPe to picture essence $Pe_{1A}$ included in the auxiliary AV data 103. Further, sound essence $Se_1$ is generated by providing key data KSe and length data LSe to sound essence $Se_{1A}$ included in the auxiliary AV data 103.

The plurality of contents packages $CP_1$-$CP_m$ include system items $SI_1$-$SI_m$, picture essence $Pe_1$-$Pe_m$ and sound essence $Se_1$-$Se_m$, respectively. Each of the picture essence $Pe_1$-$Pe_m$ and the sound essence $Se_1$-$Se_m$ includes video data and audio data which have been compressed at a higher compressibility than the video data 101. The system items $SI_1$-$SI_m$ are specific data of the plurality of contents package $CP_1$-$CP_m$.

The picture essence $Pe_m$ is, for example, a MPEG-4 elementary stream. The contents package $CP_m$ includes sound essence $Se_m$ for a plurality of channels. The total size of the sum of the system item $SI_m$ and the picture essence $Pe_m$ is, for example, 6×65536 bytes. The size of the sound essence $Se_m$ is, for example, 32768 bytes.

Each element included in the MXF file body 182 is divided based on a standard annulus period of an annulus format. Each element includes data for an integer multiple of the standard annulus period. The annulus format will be described later.

The standard annulus period is 2.0×1.001=2.002 seconds in a case where a frame frequency is, for example, 59.94 Hz, 29.97 Hz or 23.98 Hz. The standard annulus period is 2.0 seconds in a case where a frame frequency is, for example, 50 Hz, 25 Hz or 24 Hz. Each of the picture essence $Pe_1$ to $Pe_m$ includes highly compressed video data for about 2 seconds (e.g. 2.002 seconds or 2.0 seconds) according to the standard annulus period.

Figure 10:
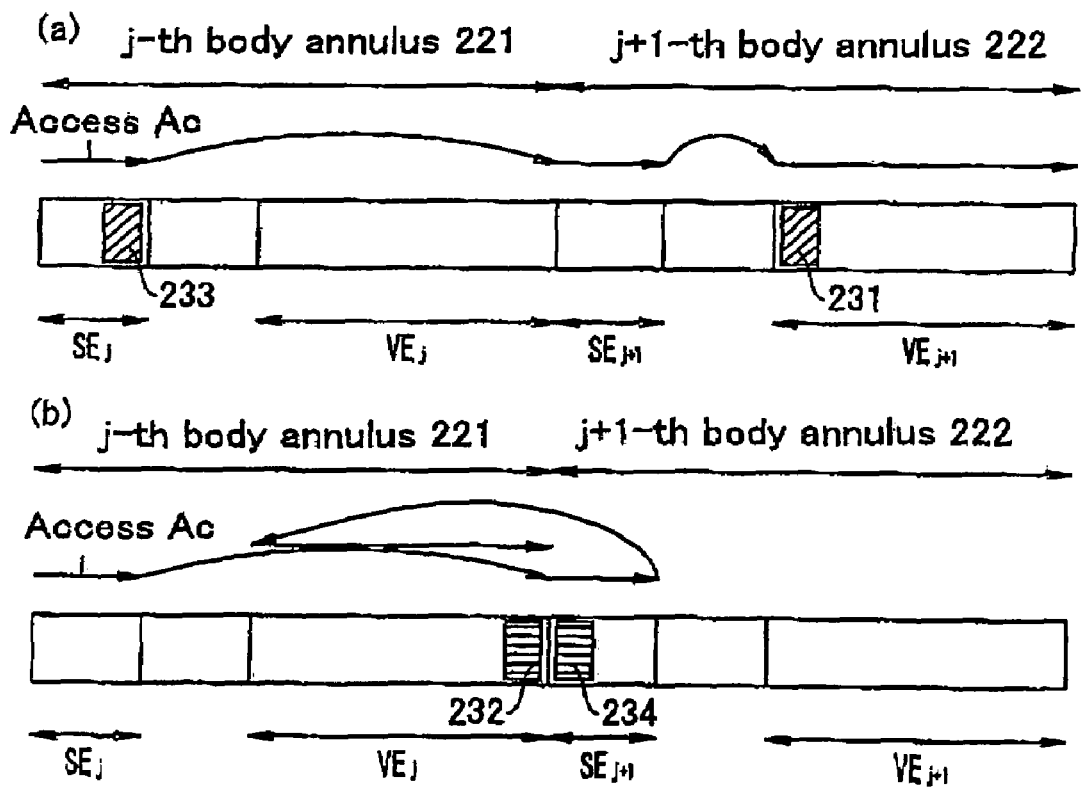
FIG. 10 is a drawing for describing an access operation to the j-th body annulus 221 and the j+1-th body annulus 222.

The real time metadata file 114 will be described below. The file generating section 110 (FIG. 10) receives real time metadata 104 including a plurality of frames 0-d (d is an integer), and generates a real time metadata file 114.

Figure 2D:
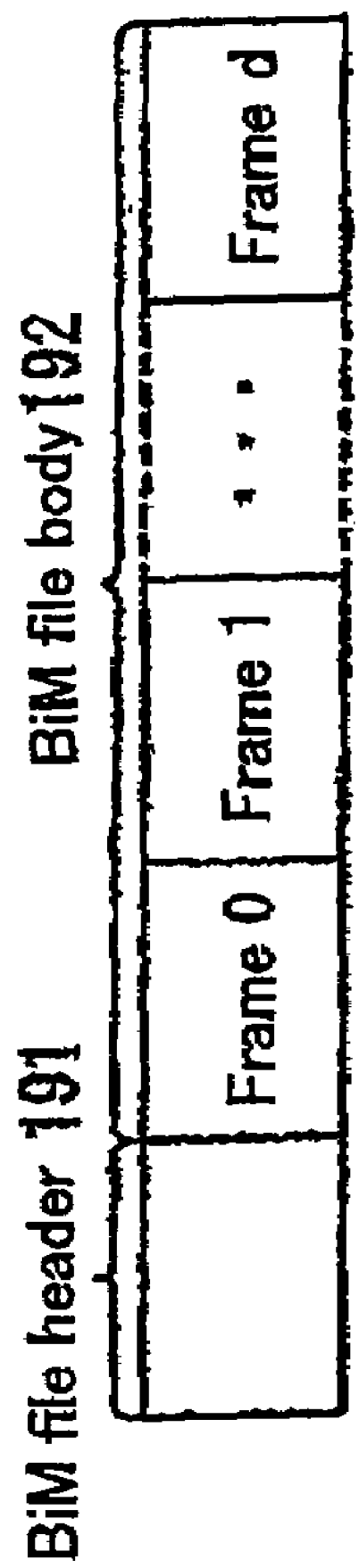
FIG. 2D is a drawing for showing a real time metadata file 114.

FIG. 2D shows the real time metadata file 114. A format of the real time metadata file 114 shown in FIG. 2D is referred to as BiM (Binary format for Multimedia description streams). Details of BiM are described in standard of ISO/IEC FDIS 15938-1 referred to as MPEG 7, and therefore detailed description on BiM will be omitted in the specification in order to simplify descriptions of the present specification.

The real time metadata file 114 includes a BiM file header 191 and a BiM file body 192 (there is no BiM file footer). The BiM file header 191 includes specific data (the number of frames or the like) of the BiM file body 192. The BiM file body 192 includes a plurality of frames 0-d. Each element included in the BiM file body 192 is divided based on a standard annulus period of the annulus format, which is similar to the MXF file body 182 (FIG. 2C).

A format of the plurality of frames 0-d is referred to as FUU (Fragment Update Unit). The data size of each of the plurality of frames 0-d is, for example, 6144 bytes. Each of the plurality of frames 0-d includes a metadata item (LTC, UMID, KLV packets or the like). Each of the plurality of frames 0-d may include ARIB metadata and Extended Real-Time Metadata.

The dividing section 120 (FIG. 1) receives the video data file 111, the audio data file 112, the auxiliary AV data file 113 and the real time metadata file 114, which are output from the file generating section 110.

The dividing section 120 divides each of the video data file 111, the audio data file 112 and the auxiliary AV data file 113 into a header, a body and a footer. The dividing section 120 divides the real time metadata file 114 into a header and a body.

Figure 3A:
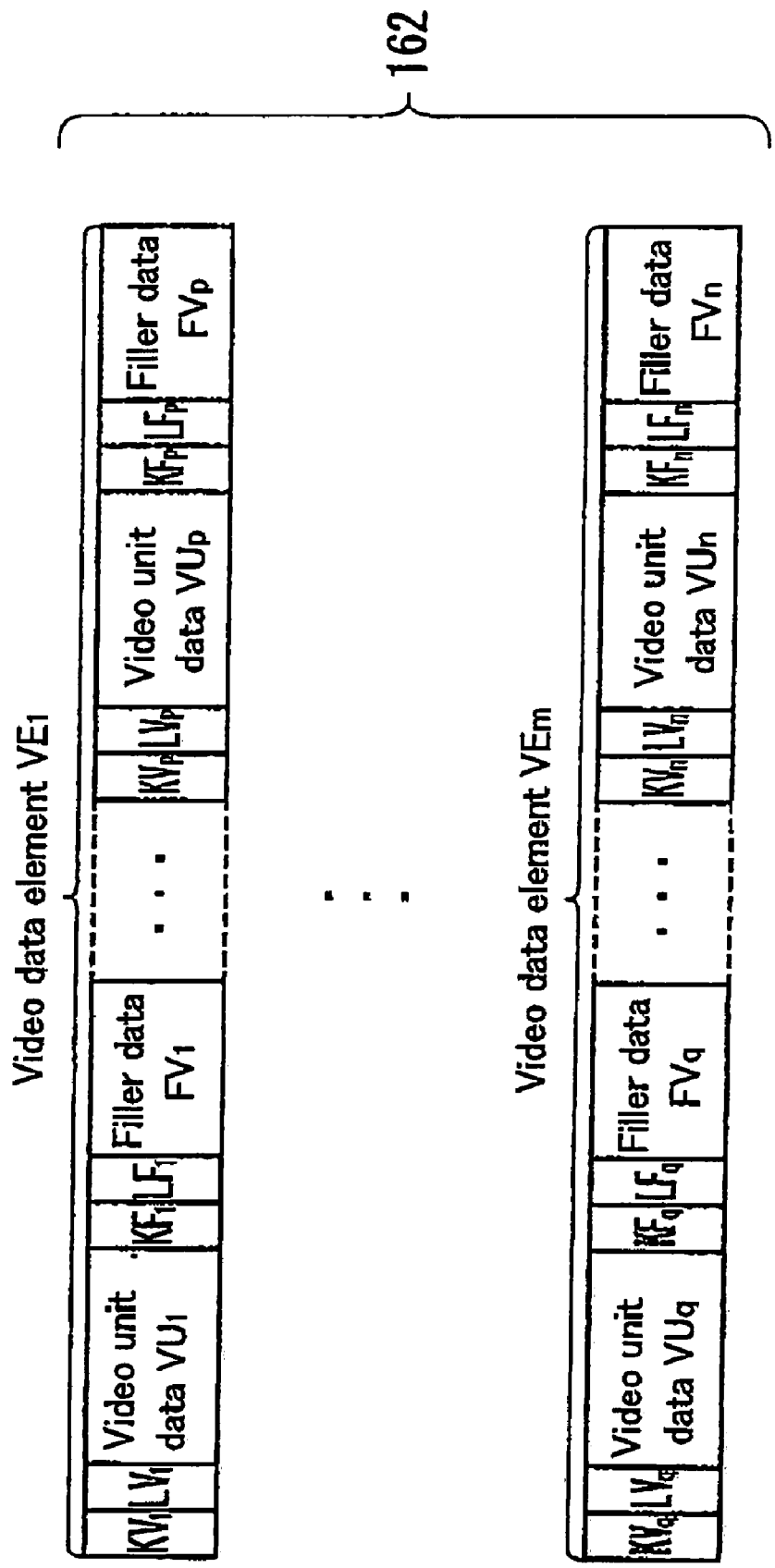
FIG. 3A is a drawing for showing a plurality of video data elements $VE_1$-$VE_m$.

The dividing section 120 divides the MXF file body 162 shown in FIG. 2A into a plurality of video data elements $VE_1$ to $VE_m$ shown in FIG. 3A (p, q shown in FIG. 3A are integers satisfying, p<q<n). The MXF file body 162 to divided, for example, such that each video data element includes video unit data having an amount required for obtaining a reproduced video for two seconds.

Figure 3B:
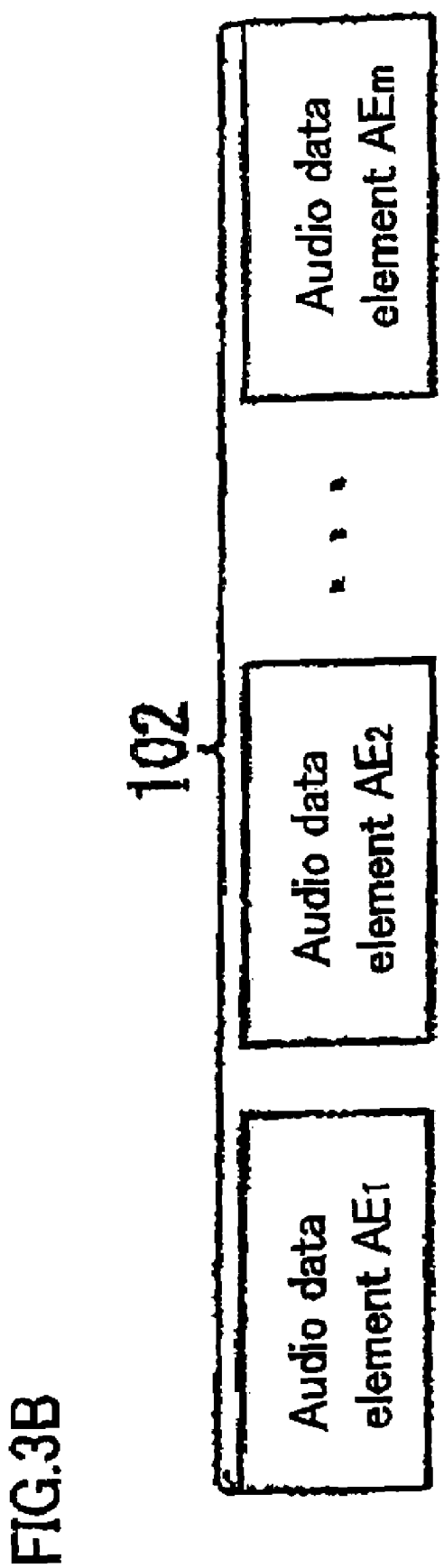
FIG. 3B is a drawing for showing a plurality of audio data elements $AE_1$-$AE_m$.

The dividing section 120 divides the MXF file body 172 shown in FIG. 2B into the audio data 102, the key data KFA, the length data LFA and the filler data PA. The dividing section 120 divides the audio data 102 into a plurality of audio data elements $AE_1$-$AE_m$ shown in FIG. 3B.

Each of the plurality of audio data elements $AE_1$-$AE_m$ is related to one of the plurality of video data elements $VE_1$-$VE_m$. For example, the audio data element $AE_1$ is a range of data of the audio data 102, which is synchronized with the video unit data $VU_1$-$VU_m$ included in the video data element $VE_1$ (i.e. audio data to be reproduced simultaneously with the video data-element $VE_1$). The dividing section 120 divides the MXF file body 172 for a plurality of channels.

Figure 3C:
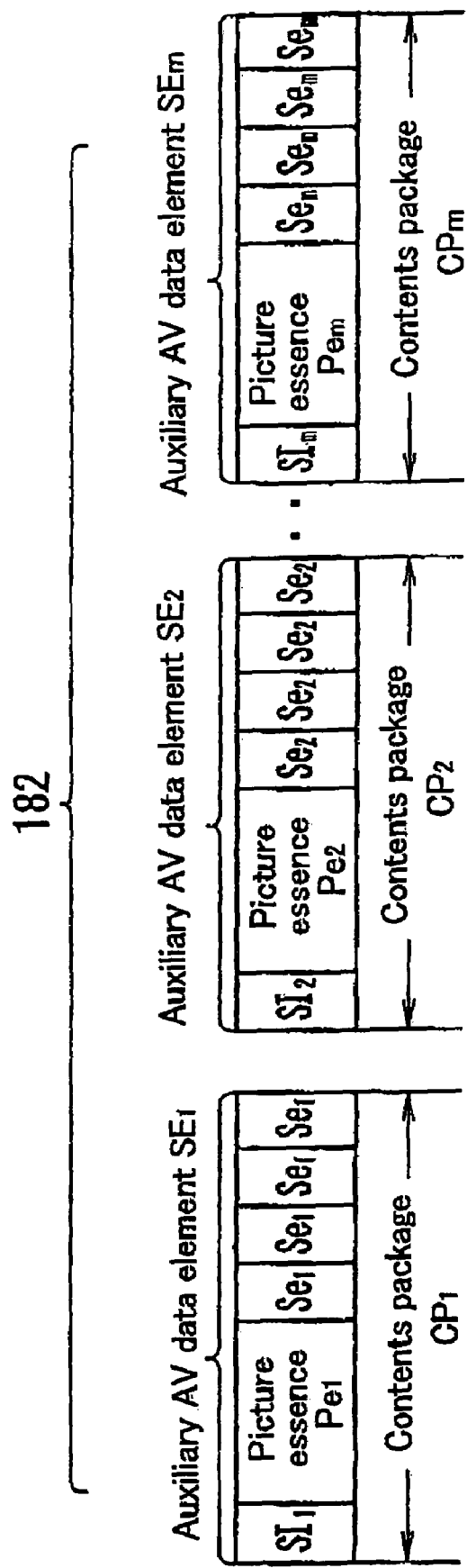
FIG. 3C is a drawing for showing a plurality of auxiliary AV data elements $SE_1$-$SE_m$.

The dividing section 120 divides the MXF file body 182 shown in FIG. 2C into a plurality of auxiliary AV data element $SE_1$-$SE_m$ shown in FIG. 3C. Each of the plurality of auxiliary AV data elements $SE_1$-$SE_m$ is related to one of the plurality of video data elements $VE_1$-$VE_m$. For example, the auxiliary AV data element $SE_1$ is highly compressed video data obtained by compressing the video unit data $VU_1$-$VU_p$ included in the video data element $VE_1$ and highly compressed audio data related thereto.

Figure 3D:
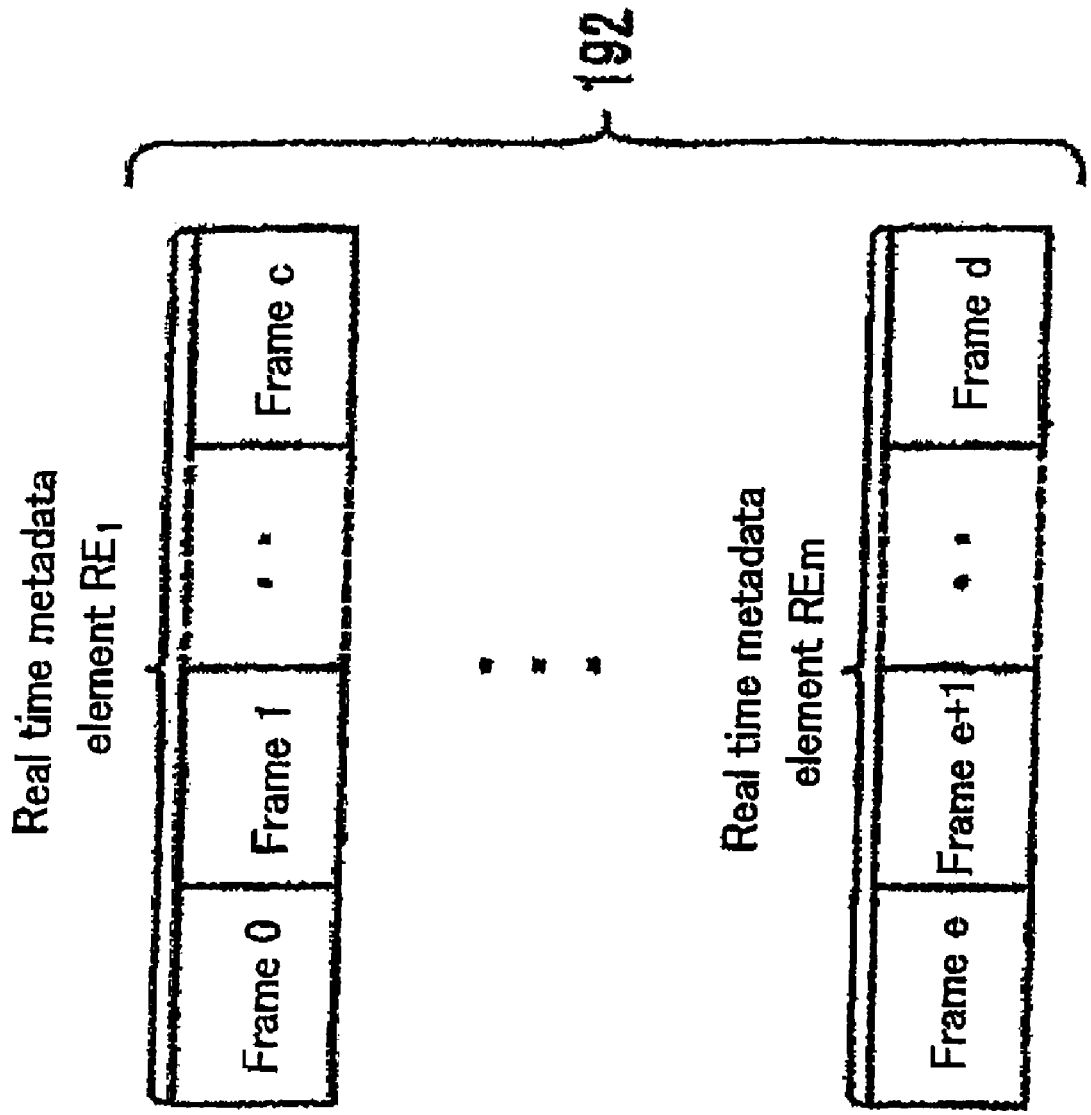
FIG. 3D is a drawing for showing a plurality of real time metadata elements $RE_1$-$RE_m$.

The dividing section 120 divides the BiM file body 192 shown in FIG. 2D into a plurality of real time metadata elements $RE_1$-$RE_m$ shown in FIG. 3D (c and e shown in FIG. 3D are integers satisfying c<e<d.).

Each of the plurality of real time metadata elements $RE_1$-$RE_m$ is related to one of the plurality of video data elements $VE_1$-$VE_m$. For example, the real time metadata element $RE_1$ represents additional information (e.g. time code, UMID) of the plurality of video unit data $VU_1$-$VU_p$ included in the video data element $VE_1$ and the audio data element $AE_1$ related to the video data element $VE_1$.

The arranging section 130 (FIG. 1) receives a header and a footer of each of the video data elements $VE_1$-$VE_m$, the audio data elements $AE_1$-$AE_m$, the auxiliary AV data elements $SE_1$-$SE_m$, the real time metadata elements $RE_1$-$RE_m$, the video data file 111, the audio data file 112 and the auxiliary AV data file 113, which are output from the dividing section 120, and receives a header of the real time metadata file 114, which is output from the dividing section 120, and arranges elements related to each other such that the elements are recorded within the same body annulus.

Figure 4:
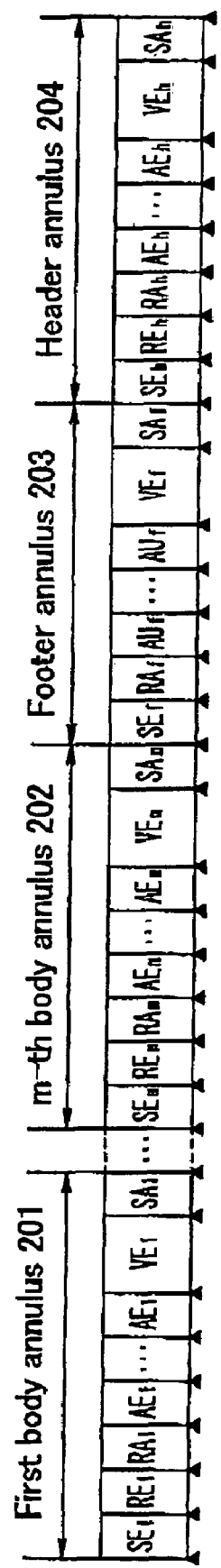
FIG. 4 is a drawing for showing arrangement data 131 generated by the arranging section 130.

FIG. 4 shows arrangement data 131 generated by the arranging section 130. The arrangement data 131 is generated in a format referred to as "annulus format". The format "annulus format" is obtained by dividing each of a plurality of data files into a plurality of elements and by arranging these elements as a unit of "annulus". The "annulus" is a unit of the annulus format. There are three types of "annulus". They are "body annulus", "header annulus" and "footer annulus".

The arrangement data 131 includes m number of body annuluses (the 1st body annulus 201 to the m-th body annulus 202), footer annulus 203 and header annulus 204.

The 1st body annulus 201 includes auxiliary AV data element $SE_1$, real time metadata element $RE_1$, rearrangement data $RA_1$ for forming a rearrangement area, audio data element $AE_1$ for a plurality of channels, video data element $VE_1$ and shift data $SA_1$ for forming a shift area.

The m-th body annulus 202 includes auxiliary AV data element $SE_m$, real time metadata element $RE_m$, rearrangement data $RA_m$ for forming a rearrangement area, audio data element $AE_m$ for a plurality of channels, video data element $VE_m$ and shift data $SA_m$ for forming a shift area. These elements and data included in the m-th body annulus 202 are arranged in this order. The audio data element $AE_m$ for the plurality of channels is arranged in the order of channel numbers.

The footer annulus 203 includes auxiliary AV data element footer data $SE_f$, rearrangement data $RA_f$ for forming a rearrangement area, audio data element footer data $AU_f$ for a plurality of channels, video data footer data $VE_f$ and shift data $SA_f$ for forming a shift area. These elements and data included in the footer annulus 203 are arranged in this order. The auxiliary AV data element footer data $SE_f$ is included in the MXF file footer 183 (FIG. 2C). The audio data element footer data $AU_f$ is included in the MXF file footer 173 (FIG. 2B). The video data footer data $VE_f$ is included in the MXF file footer 163 (FIG. 2A).

The header annulus 204 includes auxiliary AV data element header data $SE_h$, real time metadata element header data $RE_h$, rearrangement data $RA_h$ for forming a rearrangement area, audio data element header data $AE_h$ for a plurality of channels video data element header data $VE_h$ and shift data $SA_h$ for forming a shift area. These elements and data included in the header annulus 204 are arranged in this order. The auxiliary AV data element header data $SE_h$ is included in the MXF file header 181 (FIG. 2C). The real time metadata element header data $RE_h$ is included in the MXF file header 191 (FIG. 2D).

The audio data element header data $AE_h$ is included in the MXF file header 171 (FIG. 2B) (The audio data element header data $AE_h$ includes key data KA and length data LA which are audio specific data). The video data element header data $VE_h$ is included in the MXF file header 161 (FIG. 2A).

Each annulus (the 1st body annulus 201 to the m-th, body annulus 202, the footer annulus 203 and the header annulus 204) may include a reservation area data for forming a reservation area for recording additional data in the future.

Each annulus (the 1st body annulus 201 to the m-th body annulus 202, the footer annulus 203 and the header annulus 204) is recorded from a head sector of an ECC block. Each element is recorded such that the recording of the element is started from the boundary of an ECC block and the recording of the element is ended at the boundary of an ECC block. In FIG. 4, the boundary of an ECC block is represented by the symbol ▲.

The recording section 140 (FIG. 1) includes a recording head and a recording head controlling section for controlling the recording head. The recording section 140 receives the arrangement data 131 output from the arranging section 130, and records the arrangement data 131 on the information recording medium 150 by irradiating laser beam 141 onto the information recording medium 150 in accordance with the contents of the arrangement data 131. In a case where the information recording medium 150 is a magnetic recording medium, the recording section 140 applies a magnetic field onto the information recording medium 150 in accordance-with the contents of the arrangement data 131.

Figure 5A:
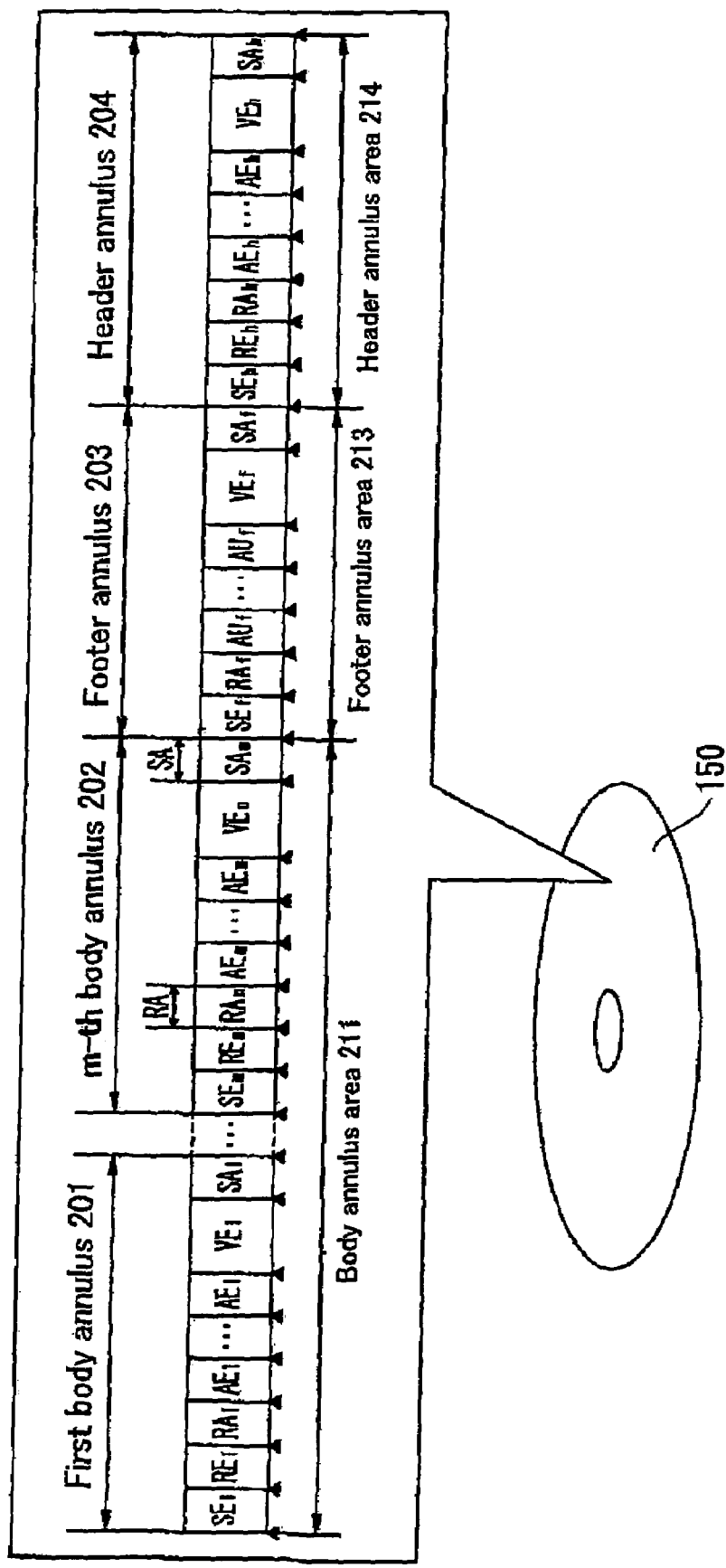
FIG. 5A is a drawing for showing an information recording medium 150 on which the arrangement data 131 of the annulus format is recorded.

FIG. 5A shows the information recording medium 150 on which the arrangement data 130 in the annulus format is recorded. In the information recording medium 150, a body annulus area 211, a footer annulus area 213 and a header annulus area 214 are formed. The 1st body annulus 201 to the m-th body annulus 202 are recorded in the body annulus area 211. The footer annulus 203 is recorded in the footer annulus area 213. The header annulus 204 is recorded in the header annulus area 214. The positional relationship between the body annulus area 211, the footer annulus area 213 and the header annulus area 214 is arbitrary. Herein, the rearrangement data $RA_1$-$RA_m$, $RA_f$, $RA_h$ and the shift data $SA_1$-$SA_m$, $SA_f$, $SA_h$ is empty data. Therefore, in the area where the rearrangement data $RA_1$-$RA_m$, $RA_f$, $RA_h$ and the shift data $SA_1$-$SA_m$, $SA_f$, $SA_h$ are arranged in the information recording medium 150, no specific data is recorded. Hereinafter, the area where the rearrangement data $RA_m$ and the shift data $SA_m$ are arranged will be described.

Figure 5B:
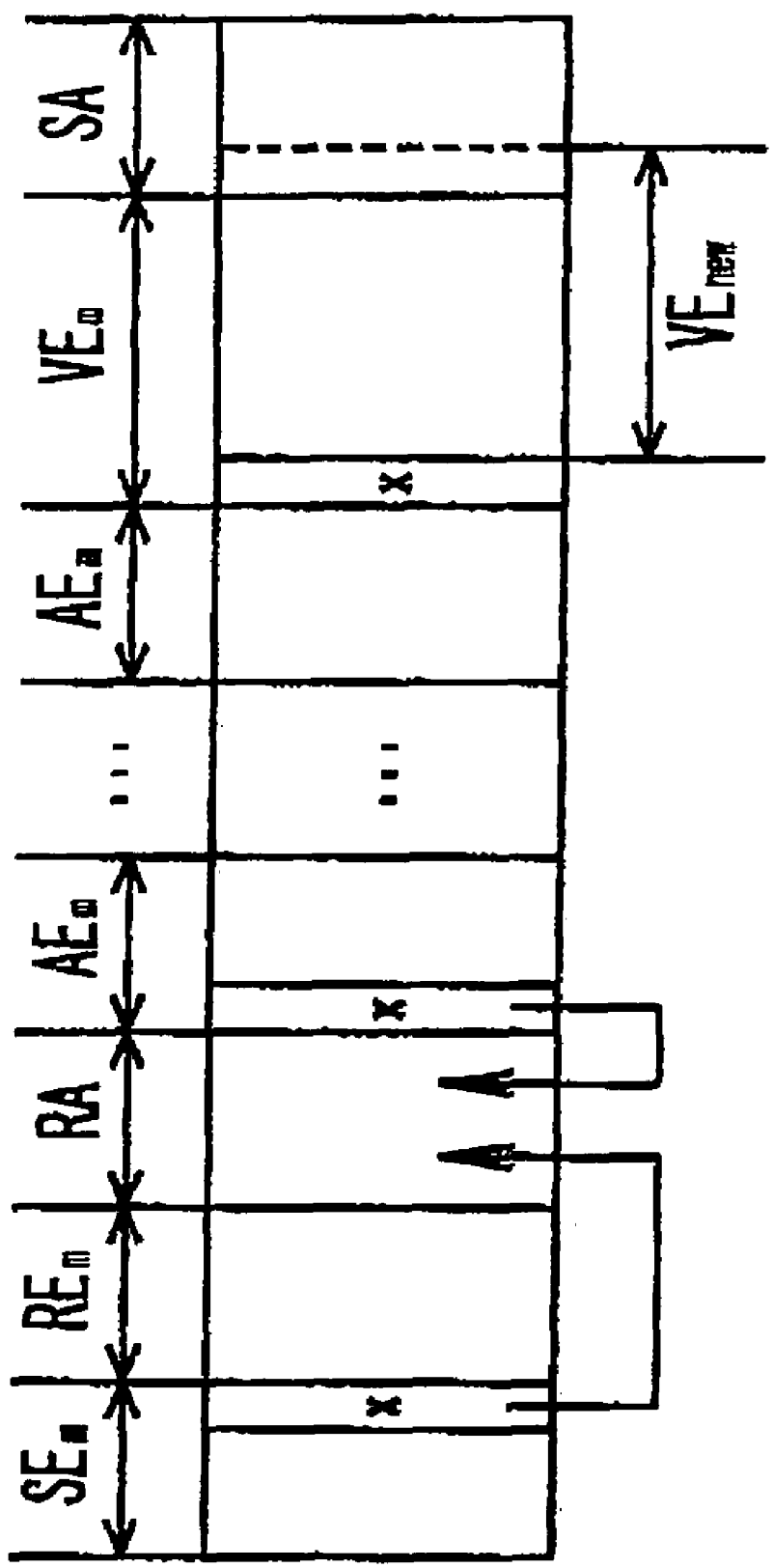
FIG. 5B is a drawing for showing a rearrangement area RA and a shift area SA.

The rearrangement area RA corresponding to the rearrangement data $RA_m$ is an area for recording data corresponding to a defective area, when there exists a defective area (e.g. an area where data cannot be written correctly when the overwriting of the data is required) in the area where the auxiliary AV data element $SE_m$, the real time metadata element $RE_m$ and the audio data element $AE_m$ are recorded. The movement of the data is made, for example, as a unit of an integer multiple the size of an ECC block (or an integer multiple the size of a sector). The size of the rearrangement area RA is, for example, 131072 bytes. For example, as shown in FIG. 5B, when the defective area (indicated by the symbol x) is detected in the area where the auxiliary AV data element $SE_m$ and the audio data element $AE_m$ are recorded, the data included in the auxiliary AV data element $SE_m$ and the audio data element $AE_m$, which is to be recorded in the defective area, is recorded in the rearrangement area RA.

The shift area SA corresponding to the shift data $SA_m$ is an area for recording the shifted data obtained by shifting a last half part of the video data element $VE_m$, when there exists a defective area (e.g. an area where data cannot be written correctly when the overwriting of the data is required) in the area where the video data element $VE_m$ is recorded. The shift of the data is made, for example, as a unit of an integer multiple the size of an ECC block (or an integer multiple the size of a sector). The size of the shift area SA is, for example, an integer multiple of 65536 bytes (e.g. 5% of the size of the video data element $VE_m$). As shown in FIG. 5B, when the defective area (indicated by the symbol x) is detected in the area where the video data element $VE_m$ is recorded, a part of the data included in the video data element $VE_m$, which is to be recorded in the defective area, is shifted and recorded in a normal recording area which is adjacent to the end of the defective area. Then, another part of the data included in the video data element $VE_m$, which is to be recorded in an area behind the defective area, is shifted behind and recorded. The data of the last half of the video data element $VE_m$ is shifted by a size of the defective area, and is recorded in the shift area SA. Thus, new recording area $Ve_{new}$ for recording the video data element $VE_m$ is formed. Herein, the detection of the defective area, the rearrangement of the data and the shift of the data are made, for example, by the arranging section 130 adjusting an arrangement pattern the arrangement data 131, when the recording apparatus 100 includes a detecting section for detecting the defective area where data cannot be recorded correctly and the detecting section detects the defective area.

Further, a real time metadata element $RE_m$ (FIG. 5A) includes UMID (Unique Material Identifier) as additional information. The UMID is an identifier for globally and uniquely identifying an AV element and unit data included in the AV element. Tho UMID has, for example, a byte sequence of 32 bytes or 64 bytes.

The UMID having a byte sequence of 32 bytes is referred to as a basic UMID. The basic UMID is used to identify an AV element. The AV element is a compressed or uncompressed video data element, a compressed or uncompressed audio data element, multiple-channel data or single channel data, and the like. In the present embodiment, for example, the AV element is the video data element $VE_m$ shown in FIG. 5A and the audio data element $AE_m$ related to the video data element $VE_m$.

The UMID having a byte sequence of 64 bytes is referred to as an extended UMID. The extended UMID is used to identify unit data included in the AV element, in addition to the identification of the AV element. The unit data is data representing a video in a predetermined data unit, such as a video clip data or one frame data included in the video data element which has been edited and completely packaged. In the present embodiment, for example, the unit data is the video unit data $VU_n$ shown in FIG. 3A.

The basic UMID includes an identification value for globally and uniquely identifying an AV element. This identification value is, for example, a value obtained by combining time when the AV element is generated with a MAC (Media Access Control) address of the device which generates the AV element.

The basic UMID is used to identify an AV element. However, the basic UMID may be used to identify data other than the AV data (e.g. auxiliary data element such as data essence, subtitle data and carousel data). Further, it is possible to assign an identification value to the basic UMID such that the video data element and the audio data element which is synchronized with the video data element can be identified as a group of elements. Further, it is possible to assign an identification value to the basic UMID such that video clip data composed of single frame data, video data element which has been edited and completely packaged, and the like can be identified. It is possible to identify data having an arbitrary length by using the basic UMID.

Figure 5C:
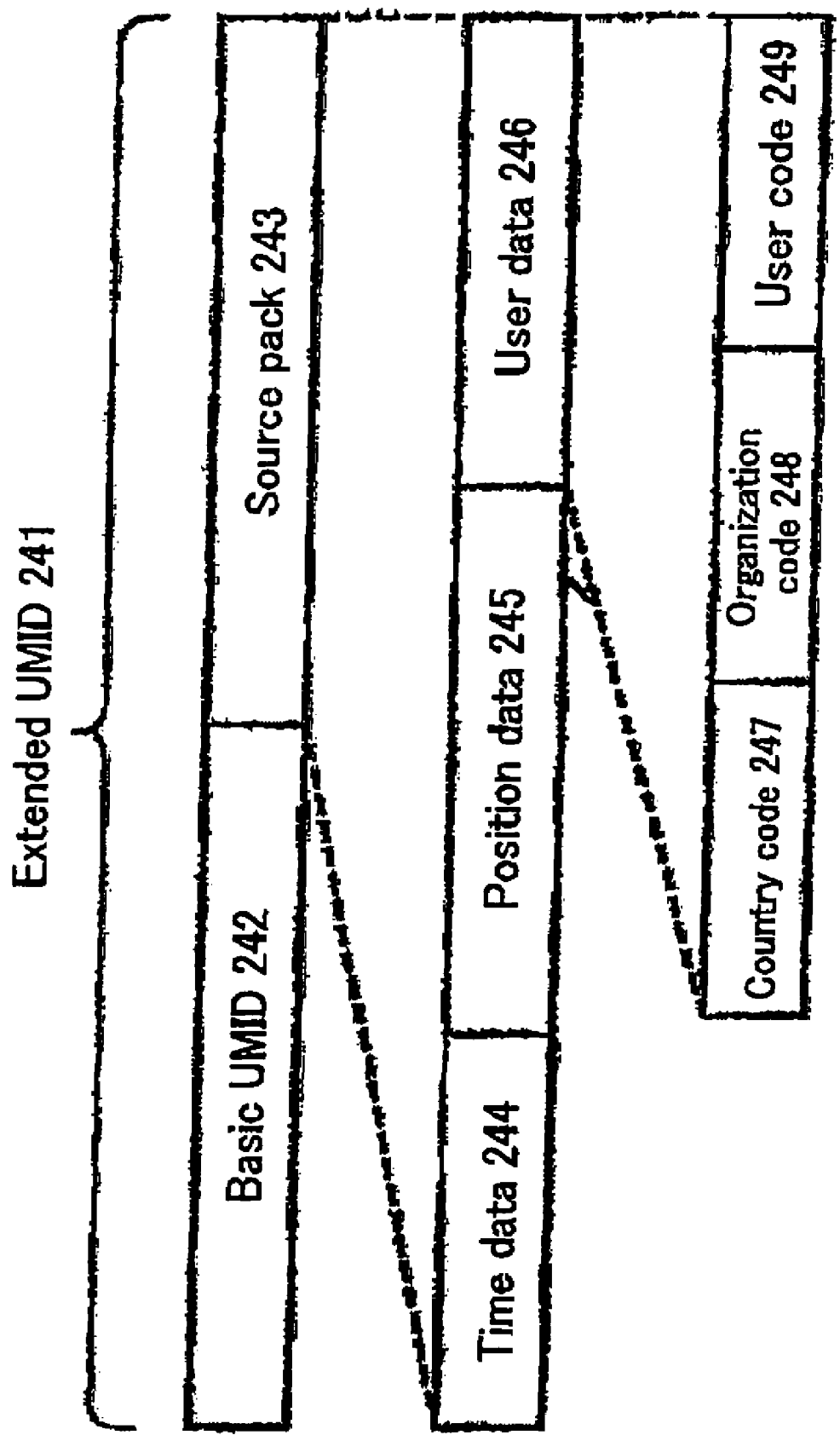
FIG. 5C is a drawing for showing an extended UMID 241.

The extended UMID is used to identify unit data included in the AV element, in addition to the identification of the AV element. An example of a format of the extended UMID is shown in FIG. 5C. The extended UMID 241 shown in FIG. 5C includes a basic UMID 242 and a source pack 243. The data size of the extended UMID 241 is, for example, 64 bytes. The data size of each of the basic UMID 242 and the source pack 243 is, for example, 32 bytes. The basic UMID 242 is included in the extended UMID 241 as an identifier for identifying an AV element. The source pack 243 includes time data 244, position data 245 and user data 246 indicating an initial generation condition for unit data included in the AV data element.

The time data 244 indicates time (or date and time) when the unit data is initially generated. The data size of the time data 244 is, for example, 8 bytes. It is possible to identify the unit data by varying time indicated by the time data 244 for each unit data. For example, when the unit data which is to be identified by using the extended UMID 241 is frame data, it is possible to vary time indicated by the time data 244 for each frame data by setting the speed at which the time indicated by the time data 244 is counted to a speed higher than the frame rates.

The position data 245 indicates geographical positional information (e.g. altitude, latitude and longitude) where the unit data is initially generated. The data size of the position data 245 is, for example, 12 bytes. When the position data 245 indicates altitude, latitude and longitude, the data size of each of data indicating altitude, data indicating latitude and data indicating longitude is, for example, 4 bytes. The position data 245 may indicate a position of the person who takes a video and may indicate a position of an object imaged in a video. Further, it is possible to use GPS (Global Positioning System) data obtained from a GPS receiver as the position data 245. The GPS receiver can be externally connected to an imaging device, or can be built in the imaging device.

The user data 246 indicates data concerning a user (e.g. a person who takes a video) who generates the unit data initially. The user data 246 includes country code 247, organization code 248 and user code 249. The data size of the user data 246 is, for example, 12 bytes. The data size of each of the country code 247, the organization code 248 and the user code 249 is, for example, 4 bytes.

The country code 247 is a character string indicating a base country of an organization which the user belongs to. For example, the country code 247 is represented by a character string such as us (United States of America), jp (Japan), uk (U.K.), de (Federal Republic of Germany), kr (Republic of Korea) in accordance with ISO 3166-1.

The organization code 248 is a character string indicating an organization which the user belongs to. It is possible to world-widely specify the organization which the user belongs to by combining the country code 247 with the organization code 248. Further, it is possible to prevent the overlapping of the organization code 248 in the same country by previously registering the organization code 248 in SMPTE (Society of Motion Picture and Television Engineers) Registration Authority.

The user code 249 is a code assigned to the user. The user code 249 is arbitrarily assigned to the user by the organization which the user belongs to.

The user data 246 may be configured using another format for identifying free-lancers not belonging to specific organizations.

The content of the data included in the basic UMID is 242 and the source pack 243 is not changed once they are determined in order to globally and uniquely identify unit data included in the AV element and the AV element.

It is possible to globally and uniquely identify the video data element $VE_m$ and the audio data element $AE_m$ (FIG. 5A) related to the video data element $VE_m$ by the real time metadata element $RE_m$ (FIG. 5A) including an identifier such as the basic UMID as additional information. As a result, it is possible to identify the video data element $VE_m$ and the audio data element $AE_m$ even if the video data element $VE_m$ and the audio data element $AE_m$ are transmitted to various users in the world through networks and the like and are edited by the users.

Further, when the real time metadata element $RE_m$ includes an identifier such as the extended UMID 241 including the source pack 243, it is possible to globally and uniquely identify the video unit data $VU_n$ (FIG. 3A) included in the video data element $VE_m$, in addition to the video data element $VE_m$ and the audio data element $AE_m$.

Further, it is possible to easily perform various editing operations by the real time metadata element $RE_m$ including an identifier such as the extended UMID 241. For example, editing for displaying a map indicating a position where a video is taken at a part of a display screen during the reproduction of the video unit data $VU_n$ can be easily performed by previously storing geographical data for all of the world to an editing device and by reading the geographic data indicating a position specified by the position data 245 using the editing device.

In the present invention, each element such as the video data elements $VE_1$-$VE_m$ and the audio data elements $AE_1$-$AE_m$ is arranged at a sector boundary of the information recording medium 150. As described above, the total size of the sum of the video unit data $VU_i$, the key data $KV_i$, the length data $LV_i$ the filler data $FV_i$, the key data $KF_i$ and the length data $LF_i$ is equal to an integer multiple the size of a sector unit of the information recording medium 150. As a result, a head of the frame included in each of the video unit data $VU_1$-$VU_n$ is arranged at a sector boundary. Accordingly, when a user performs partial deletion of a video, the deletion can be performed by a sector unit. As a result, editing for partial deletion can be performed at a high speed by changing the management information of a file system, without the occurrence of the movement of the data.

Further, in the present invention, the header annulus 204 includes the auxiliary AV data element header data $SE_h$, the real time metadata element header data $RE_h$, the audio data element header data $AE_h$ for a plurality of channels, and the video data element header data $VE_h$. Since each header includes data indicating a duration recorded, the content of each header is fixed when the recording is completed. A seek operation at the time of the recording can be reduced by writing header annulus into an area other then the area where the body annulus is recorded after the recording of the body annulus is completed. Further, it is possible to read each header data (especially, real time metadata element header data $RE_h$) at a high speed, by intensively arranging each header data in the header annulus 204.

Further, in the present invention, the audio data element header data $AE_h$ includes key data KA and length data LA which are audio specific data. The length data is fixed when the recording of the audio data is completed. As a result, by arranging the length data in the header, a seek operation can be reduced. The 1st annulus body 201 to the m-th body annulus 202 do not include key data KA and length data LA. As a result, it is possible to reproduce data included in the 1st body annulus 201 to the m-th body annulus 202 even if a reproduction apparatus or a reproduction program which cannot interpret key data KA and length data LA is used.

Further, it is possible to generate a video data file having a format which is similar to the format of the audio data file 112 shown in FIG. 2B based on the video data 101. Such a video data file is a data file obtained by arranging video data, instead of audio data shown in FIG. 2B. In this case, specific data indicates data concerning video data. This video data file is divided into a plurality of video data elements in a similar manner as the plurality of audio data elements shown in FIG. 3B, and the plurality of video data elements are arranged in the body annulus.

Further, the audio data 102 may include a plurality of audio unit data divided as a unit of a predetermined data. It is possible to generate an audio data file having a format which is similar to the format of the video data file 111 shown in FIG. 2A. Such an audio data file is a data file obtained by arranging audio unit data, instead of video data shown in FIG. 2A. In this case, specific data indicates data concerning audio unit data. This audio data file is divided into a plurality of audio data elements in a similar manner as the plurality of video data elements shown in FIG. 3A, and the plurality of audio data elements are arranged in the body annulus.

FIG. 6(a) shows the j-th body annulus 221 (j is an integer satisfying $1 \leq j \leq m$). In the j-th body annulus 221, the real time metadata element $RE_j$ and the audio data element $AE_j$ for four channels are arranged ahead of the video data element $VE_j$ in a reproduction direction. In FIG. 6, other elements are omitted to simplify the description. FIG. 6(b) shows the body annulus 227 for purpose of the comparison. In the body annulus 227, the real time metadata element $RE_j$ and the audio data element $AE_j$ for four channels are arranged behind the video data element $VE_j$ in the reproduction direction.

In the j-th body annulus 221, it is possible to start the reproduction of data (i.e. start the display of data) when the pickup starts reading data from the head of the video data element $VE_j$ (the starting point of the reproduction is denoted by symbol Rs). Then, all of the real time metadata element $RE_j$ in the j-th body annulus 221 and the audio data element $AE_j$ for four channels is stored into a buffer memory of a reproduction apparatus. When the reading of data is started from the head of the video data element $VE_j$, the real time metadata element $RE_j$, the audio data element $AE_j$ for four channels and the video data element $VE_j$ can be reproduced at the same time.

In the body annulus 227 shown in FIG. 6(b), it is possible to start the reproduction of data when the pickup starts reading data from the head of the audio data element $AE_j$ for the fourth channel. If the video data element $VE_j$ in the body annulus 227, the real time metadata element $RE_j$, the audio data element $AE_j$ for the first to third channels are not stored into the buffer memory, the real time metadata element $RE_j$, the audio data element $AE_j$ for four channels and the video data element $VE_j$ cannot be reproduced at the same time.

For example, when the data format is a DV format, it is assumed that each element in the annulus includes data for two seconds, and 1 ECC block is 64 k bytes. In this case, the real time metadata element $RE_j$ is about 6 ECC block, the audio data element $AE_j$ is about 3 ECC blocks, and the video data element $VE_j$ is about 100 ECC block. Thus, the video data element $VE_j$ has the biggest data size for the same duration of time. Accordingly, it is possible to quickly start the reproduction of data by arranging the real time metadata element $RE_j$ and the audio data element $AE_j$ for four channels ahead of the video data element $VE_j$. As a result, it is possible to reduce a time period from the time when the user instructs the reproduction apparatus to start the re-production of data to the time when a video, an audio and additional data are actually output from a monitor and a speaker.

FIG. 7 shows an access procedure of the pickup for reading the auxiliary AV data element $SE_j$ and the real time metadata element $RE_j$ from a plurality of body annuluses (i.e. the j-th body annulus 221, the j+1-th body annulus 222 and the g-th body annulus 223 (g is an integer satisfying $j+1<g \leq m$). In FIG. 7, a part of the elements is omitted to simplify the description. The flow of the access is denoted by symbol Ac.

When the audio data element $AE_j$ and the video data element $VE_j$ recorded in the information recording medium 150 are searched at a high speed, the auxiliary AV data element $SE_j$ is reproduced without reproducing the audio data element $AE_j$ and the video data element $VE_j$. This is because the compressibility of the auxiliary AV data element $SE_j$ is higher than that of the video data element $VE_j$, and therefore, the auxiliary AV data element $SE_j$ can be read from the information recording medium 150 at a higher speed. When a high speed search is performed, a predetermined scene can be easily detected by displaying a time code and UMID included in the real time metadata element $RE_j$ in addition to displaying a Video. By arranging the auxiliary AV data element $SE_j$ and the real time metadata element $RE_j$ such that they are adjacent to each other and by recording them on the information recording medium 150, it is possible to eliminate skipping access of the pickup between the auxiliary AV data element $SE_j$ and the real time metadata element $RE_j$. As a result, it is possible to read the auxiliary AV data element $SE_j$ and the real time metadata element $RE_j$ from the information recording medium 150 at a higher speed.

Further, when the auxiliary AV data element $SE_j$ includes highly compressed audio data, it is possible to detect a predetermined scene while the user listens to audio output during performing a high speed search.

FIG. 8 is a drawing describing a procedure of starting the reproduction of data from a high speed search.

FIG. 8(a) shows the j-th body annulus 221, the j+1-th body annulus 222 and the g-th body annulus 223. In FIG. 8, a part of the elements is omitted to simplify the description. In the j-th to the g-th body annulus 221-223, each of the auxiliary AV data elements $SE_j$-$SE_g$ is arranged ahead of the video data elements $VE_j$-$VE_g$ in a reproduction direction. FIG. 8(b) shows the body annulus 224-226 for the purpose of the comparison. In the body annulus 224-226, each of the auxiliary AV data elements $SE_j$-$SE_g$ is arranged behind the video data elements $VE_j$-$VE_g$ in the reproduction direction.

Referring to FIG. 8(a), a high speed search using the auxiliary AV data element $SE_j$ in the j-th body annulus 221 is described. In the high speed search, at the time Ut when a specific scene is designated by the user, the pickup accesses elements ahead of the auxiliary AV data element $SE_j$ indicating the specific scene, since the pickup performs the pre-reading in a usual manner (The pre-reading of the pickup is denoted by symbol Pr). In order to read a video specified by the user from the video data element $VE_j$, the pickup accesses the video data element $VE_j$. Further, when the auxiliary AV data element $SE_j$ includes highly compressed audio data, it is possible to detect a predetermined scene while the user listens to audio output during performing a high speed search. Further, it is also possible to output metadata during performing a high speed search by including the real time metadata element $RE_j$. When the audio data and metadata are output in addition to the video data, the pickup accesses the real time metadata element $RE_j$.

Referring to FIG. 8(b), in order for the pickup to access the video data element $VE_j$ corresponding to the image designated specified by the user at the time when a specific scene is designated by the user, it is necessary for the pickup to access elements over a longer distance than the shown in FIG. 8(a). This is because, in FIG. 8(b), necessary data is recorded ahead of the auxiliary AV data element $SE_j$.

As shown in FIG. 8(a), it is possible to quickly output the video data of a main part from a high speed search by arranging the auxiliary AV data element $SE_j$ at a head in the body annulus.

Figure 9:
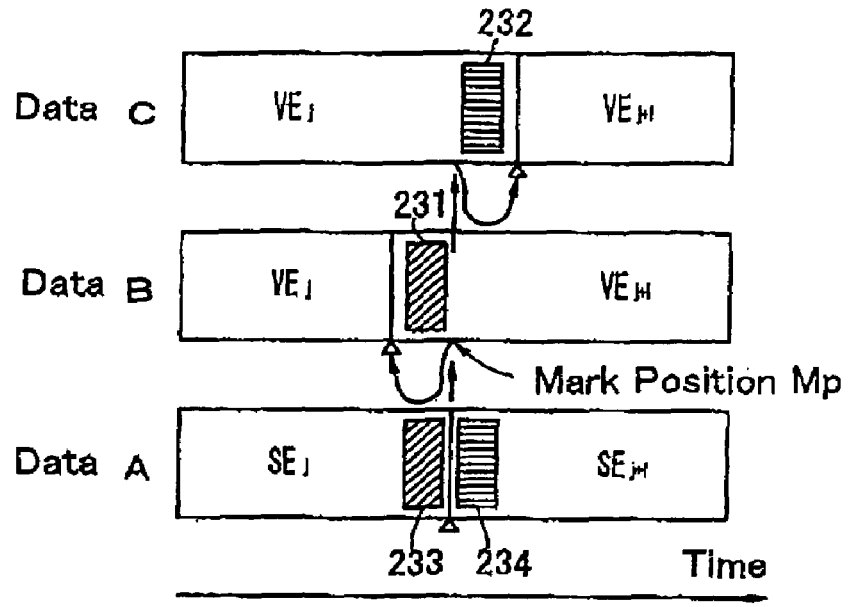
FIG. 9 is a drawing for describing which one of the body annuluses include data in the vicinity of a boundary of an ECC block, when a data file is divided into a plurality of elements at the boundary of an ECC block before or after the mark.

FIG. 9 is a drawing for describing which one of the body annuluses includes data in the vicinity of an ECC block boundary, when a data file is divided into a plurality of elements at an ECC block boundary before or after the mark. The ECC block boundary is denoted by symbol Δ.

Data A shown in FIG. 9 represents the auxiliary AV data elements $SE_j$, $SE_{j+1}$. Data B, C shown in FIG. 9 represent the video data elements $VE_j$, $VE_{j+1}$, respectively.

Data B shows a data arrangement when the video data file 111 is divided at a position. The position is ahead of the mark position Mp and is spaced from the mark position Mp by an integer multiple the size of an ECC block unit of the information recording medium 150.

Data C show a data arrangement when the video data file 111 is divided at a position. The position is behind the mark position Mp and is spaced from the mark position Mp by an integer multiple the size of an ECC block unit of the information recording medium 150.

The dividing process is performed by the dividing section 120 (FIG. 1). The dividing section 120 provides a mark to a position corresponding to a head of the auxiliary AV data element $SE_{j+1}$ in the video data file 111 in order to specify the position. Each of the auxiliary AV data elements is obtained by dividing the MXF file body 182 (FIG. 2C) based on a standard annulus period of the annulus format. The dividing section 120 provides a mark to a position corresponding to a head position of the auxiliary AV data element $SE_{j+1}$ in the video data file 111 (i.e. a head position in the standard annulus period).

Each of the video data elements is obtained by dividing the MXF file body 162 (FIG. 2A) based on a standard annulus period of the annulus format. In the dividing process shown in FIG. 9, the video data file 111 is divided based on the standard annulus period. A start byte position $VE_{SBP}$ (i) of the video data element, which is a dividing position of the video data file 111, is obtained by $VE_{SBP}(i)=int[\{P_{VE}(i \times Na)\}/65536] \times 65536$. Herein, $P_{VE}(x)$ denotes a byte position from a head of the MXF file body, and denotes a starting position of the frame data of frame number x (x=1, 2, 3, . . . ). i denotes a serial number assigned to each of the body annuluses (i=1, 2, 3, . . . ). Na denotes the number of frames per one standard annulus period. The video data file 111 is divided such that the size of divided video data element is equal to an integer multiple of 65536 bytes.

Concerning data B, the dividing section 120 divides the video data file 111 such that video data 231 corresponding to an end part of the auxiliary AV data element $SE_j$ is included in a first half part of the video data element $VE_{j+1}$.

Concerning data C, the dividing section 120 divides the video data file 111 such that video data 232 corresponding to a head part of the auxiliary AV data element $SE_{j+1}$ is included In a last half part of the video data element $VE_j$.

FIG. 10(a) is a drawing for describing an access operation to the j-th body annulus 221 and the j+1-th body annulus 222 when the video data file 111 is divided as data B. The video data 231 corresponding to an end part of the auxiliary AV data element $SE_j$ is included in a first half part of the video data element $VE_{j+1}$. When the reproduction of data is performed, a head data of the auxiliary AV data element $SE_j$ of the j-th body annulus 221 (including the auxiliary AV data 233 related to the video data 231) is read, then the auxiliary AV data element $SE_{j+1}$ of the j+1-th body annulus 222 is accessed to read data, and then the video data element $VE_{j+1}$ is accessed to read data.

FIG. 10(b) is a drawing for describing an access operation to the j-th body annulus 221 and the j+1-th body annulus 222 when the video data file 111 is divided as data C. The video data 232 corresponding to a head part of the auxiliary AV data element $SE_{j+1}$ is included in a last half part of the video data element $VE_j$. When the reproduction of data is performed, the auxiliary AV data element $SE_j$ of the j-th body annulus 221 is accessed to read data, then the auxiliary AV data element $SE_{j+1}$ of the j+1-th body annulus 222 (including the auxiliary AV data 234 related to the video data 232) is accessed to read data, and then the video data element $VE_j$ is accessed to read data.

When an access operation of the pickup shown in FIG. 10(a) is compared to an access operation of the pickup shown in FIG. 10(b), it is appreciated that the travel distance of the pickup shown in FIG. 10(a) is much shorter than the travel distance of the pickup shown in FIG. 10(b). When the auxiliary AV data element and the video data element are reproduced at the same time, an access time is further shortened by dividing the video data file 111 as shown in data B of FIG. 9. Further, when the auxiliary AV data element and video data element can be reproduced at the same time, it is possible to send the auxiliary AV data element to a remote reproduction apparatus via a network and the like while displaying video data element on a monitor, and it is possible to reproduce data while the video data element is synchronized with the auxiliary AV data element.

Further, when the mark position matches a boundary of ECC block, it to possible to divide the video file at the boundary of the ECC block.

Figure 11:
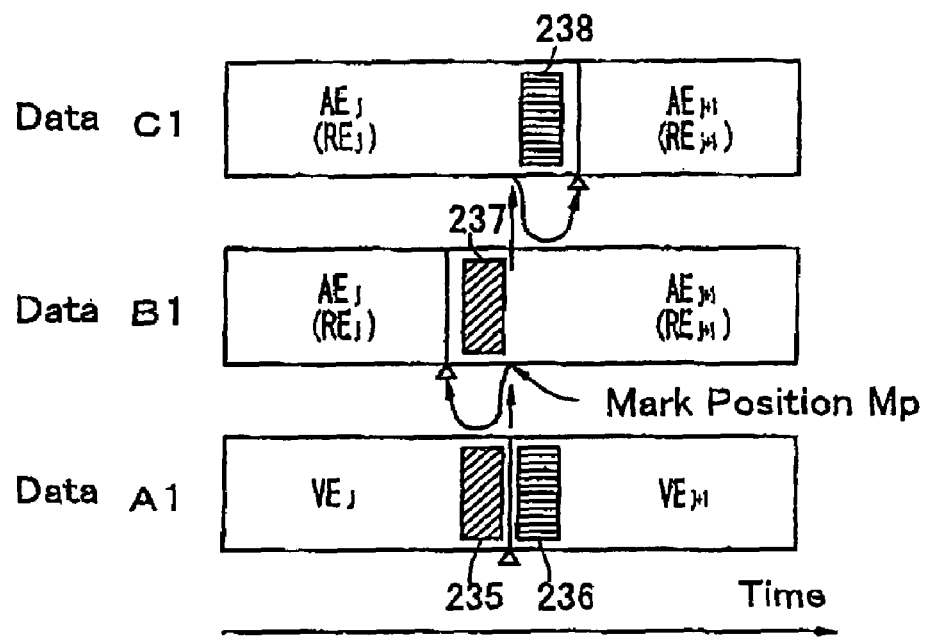
FIG. 11 is a drawing for describing which one of the body annuluses include data in the vicinity of a boundary of an ECC block, when a data file is divided into a plurality of elements at the boundary of an ECC block before or after the mark.

FIG. 11 is a drawing for describing which one of the body annuluses includes data in the vicinity of an ECC block boundary, when a data file is divided into a plurality of elements at an ECC block boundary before or after the mark. The ECC block boundary is denoted by symbol Δ.

Data A1 shown in FIG. 11 represents the video data elements $VE_j$, $VE_{j+1}$. Data B1, C1 shown in FIG. 11 represent the audio data elements $AE_j$, $AE_{j+1}$ (or the real time metadata element $RE_j$, $RE_{j+1}$), respectively.

Data B1 shows a data arrangement when the audio data file 112 (or the metadata file 114) is divided at a position. The position is ahead of the mark position Mp and is spaced from the mark position Mp by an integer multiple of an ECC block unit of the information recording medium 150.

Data C1 shows a data arrangement when the audio data file 112 (or the metadata file 114) is divided at a position. The position is behind the mark position Mp and is spaced from the mark position Mp by an integer multiple of an ECC block unit of the information recording medium 150.

The dividing process is performed by the dividing section 120 (FIG. 1). The dividing section 120 provides a mark to a position corresponding to a head of the video data element $VE_{j+1}$ in the audio data file 112 (or the metadata file 114) in order to specify the position. Each of the video data elements is obtained by dividing the MXF file body 162 (FIG. 2A) based on a standard annulus period of the annulus format. The dividing section 120 provides a mark to a position corresponding to a head position of the video data element $VE_{j+1}$ in the audio data file 112 (or the metadata file 114) (i.e. a head position of the standard annulus period).

Each of the audio data elements is obtained by dividing the audio data file 112 based on a head frame data starting time of the video element. In the dividing process shown in FIG. 11, the audio data file 112 to divided based on the head frame data starting time of the video element. The head frame data starting time $VE_{ST}(i)$ of the video element is obtained by $VE_{ST}(i)=T_{VE}\{VE_{SBP}(i)\}$). Herein, $T_{VE}(y)$ denotes a starting time of the frame corresponding to a start byte position y of video data element.

The start byte position $AE_{SBP}(i)$ the an audio data element, which is a dividing position of the audio data file 112, is obtained by $AE_{SBP}(i)=\text{int}[\{k\times Fs\times VE_{ST}(i)+(65536-1)\}/65536]\times 65536$. Herein, k denotes the byte length per one sample data (e.g. 2 bytes or 3 bytes). Fs denotes a sampling frequency (e.g. 48 kHz). The audio data file 112 is divided such that the size of divided audio data element is equal to an integer multiple of 65536 bytes.

Each of the real time metadata elements is obtained by dividing the real time metadata file 114 having a BiM file body based on start frame data of the video element. In the dividing process shown in FIG. 11, the real time metadata file 114 is divided based on the start frame data of the video element.

The frame number $VE_{SFN}(i)$ of the start frame data of the video element is obtained by $VE_{SFN}(i)=N_{VE}\{VE_{SBP}(i)\}$. Herein, $N_{VE}(y)$ denotes a frame number of a frame corresponding to a start byte position y of the video data element.

The start byte position $RE_{SBP}(i)$ of the real time metadata element, which is a dividing position of the real time metadata file 114, is obtained by $RE_{SBP}(i)=\text{int}[\{6144\times VE_{SFN}(i)+(65536-1)\}/65536]\times 65536$. The real time metadata file 114 is divided such that the size of divided real time metadata element is equal to an integer multiple of 65536 bytes.

Concerning data B1, the dividing section 120 divides the audio data file 112 (or the real time metadata file 114) such that audio data (or real time metadata) 237 corresponding to the video data 235 of an end part of the video data element $VE_j$ is included in a first half part of the audio data element $AE_{j+1}$ (or real time metadata element $RE_{j+1}$).

Concerning data C1, the dividing section 120 divides the audio data file 112 (or the real time metadata file 114) such that audio data (or real time metadata) 238 corresponding to the video data 236 of a head part of the video data element $VE_{j+1}$ is included in a last half part of the audio data element $AE_j$ (or real time metadata element $RE_j$).

Figure 12:
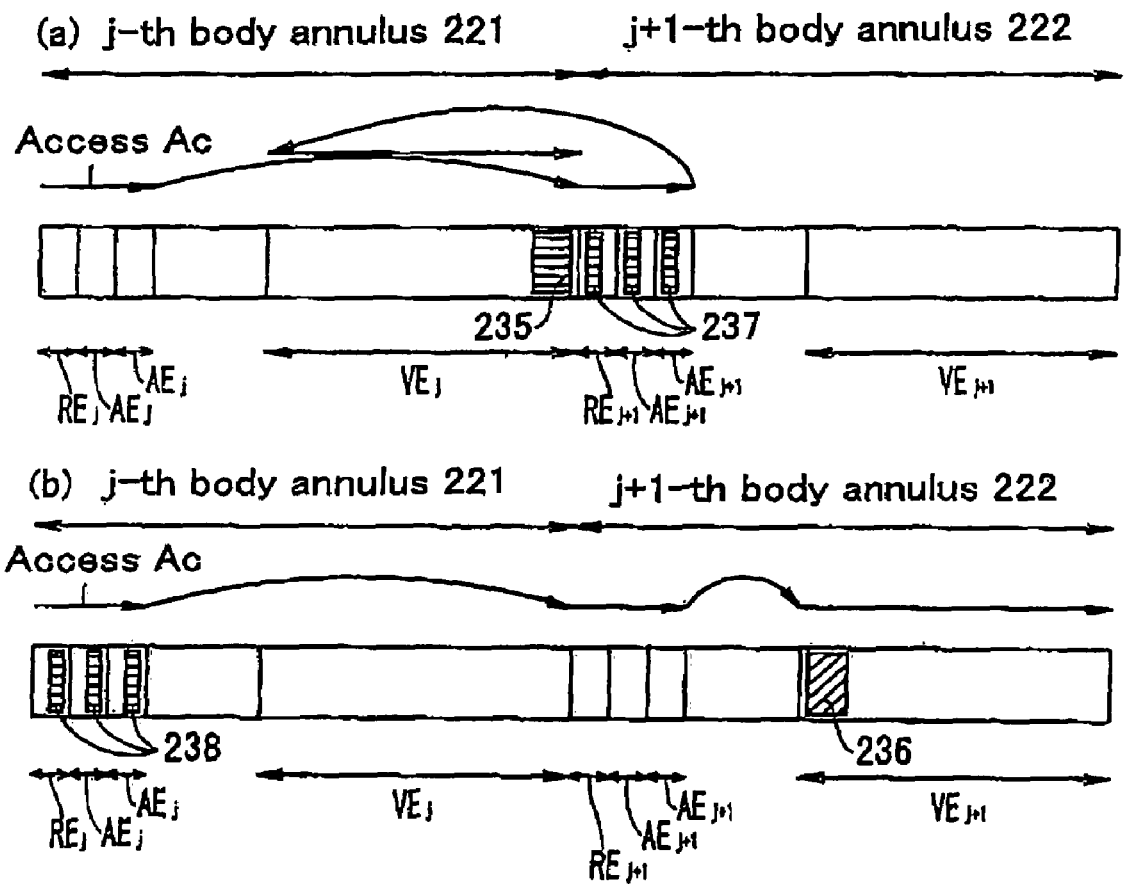
FIG. 12 is a drawing for describing an access operation to the j-th body annulus 221 and the j+1-th body annulus 222.

FIG. 12(a) is a drawing for describing an access operation to the j-th body annulus 221 and the j+1-th body annulus 222, when the audio data file 112 and the real time metadata file 114 are divided as data B1. These files are divided such that audio data (or real time metadata) 237 corresponding to the video data 235 of an end part of the video data element $VE_1$ is included in a first half part of the audio data element $AE_{j+1}$ (or real time metadata element $RE_{j+1}$).

When the reproducing of data is performed, the real time metadata element $RE_j$ and the audio data element $AE_j$ of the j-th body annulus 221 are read, then the real time metadata element $RE_{j+1}$ and the audio data element $AE_{j+1}$ of the j+1-th body annulus 221 are read, and then the video data element $VE_j$ is read.

FIG. 12(b) is a drawing for describing an access operation to the j-th body annulus 221 and the j+1 body annulus 222, when the audio data file 112 and the real time metadata file 114 are divided as data C1. These files are divided such that audio data (or real time metadata) 238 corresponding to the video data 236 of a head part of the video data element $VE_{j+1}$ is included in a last half part of the audio data element $AE_j$ (or real time metadata element $RE_j$).

When the reproducing of data is performed, the real time metadata element $RE_j$ and the audio data element $AE_{j+1}$ of the j-th body annulus 221 are read, then the real time metadata element $RE_{j+1}$ and the audio data element $AE_j$ of the j+1-th body annulus 222 are read, and then the video data element $VE_{j+1}$ is read.

When an access operation of the pickup shown in FIG. 12(a) is compared to an access operation of the pickup shown in FIG. 12(b), it is appreciated that the travel distance of the pickup shown in FIG. 12(b) is much shorter than the travel distance of the pickup shown in FIG. 12(a). When the real time metadata element, the audio data element and the video data element are reproduced at the same time, an access time is further shortened by dividing such that the real time metadata element and the audio data element are arranged ahead of the video data element.

Further, by dividing the video data file, the audio data file, the real time metadata file as a unit of an ECC block, when the video data file, the audio data file, the real time metadata file are edited (e.g. overwritten) individually, it is not necessary to rewrite other data.

Further, by dividing the audio data file and the real time metadata file based not on the auxiliary AV data but on the dividing time of the video data, when the video data and the audio data of a main part are reproduced from an arbitral point, it is possible to reduce an access process of the pickup.

Further, when the mark position matches a boundary of an ECC block, it is possible to divide the audio data file or the real time metadata file at the boundary of the ECC block.

INDUSTRIAL APPLICABILITY

According to the recording apparatus, the information recording medium and the recording method of the present invention, a total size of the sum of the video unit data, the video specific data, the filler data and the filler data specific data is equal to an integer multiple the size of a sector unit of the information recording medium. This makes it possible to access a frame to be edited at a high speed when a user performs editing such as partial deletion of a video. As a result, the editing can be performed at a high speed. Thus, the present invention is useful for the recording apparatus and the recording method for recording video data and audio data on the information recording medium, the information recording medium on which video data and audio data are recorded and the like.

Further, according to the recording apparatus, the information recording medium and the recording method of the present invention, the metadata element and the audio data element are arranged ahead of the video data element within a predetermined recording unit. Further, the metadata element and the auxiliary data element are arranged such that they are adjacent to each other in the predetermined recording unit. Further, the auxiliary data element is arranged ahead of the metadata element, the audio data element and the video data element. According to the data arrangement of the present invention, it is possible to perform a high speed reproduction operation including a high speed search. Thus, the present invention is useful for the recording apparatus and the recording method for recording video data and audio data on the information recording medium, the information recording medium on which video data and audio data are recorded, and the like.

The invention claimed is:

1. A recording apparatus comprising:
 a file generating section for receiving video data including a plurality of video unit data each representing a video and audio data related to the video data, generating a video data file by providing a plurality of video specific data to the plurality of video unit data, the plurality of video specific data for identifying the plurality of video unit data, and generating an audio data file by providing audio specific data to the audio data, the audio specific data for identifying the audio data;

a dividing section for receiving the video data file and the audio data file, dividing the video data file into a plurality of video data elements, and dividing the audio data file into a plurality of audio data elements related to the plurality of video data elements, wherein an i-th (i is an integer) video data element of the plurality of video data elements includes a predetermined number of video unit data of the plurality of video unit data;

an arranging section for arranging the i-th video data element and an i-th audio data element related to the i-th video data element among the plurality of audio data elements such that the i-th audio data element and the i-th video data element are recorded within a predetermined recording unit; and a recording section for recording the arranged i-th video data element and the arranged i-th audio data element on an information recording medium, wherein the file generating section further receives auxiliary data including compressed video data which has been compressed at a higher compressibility than the video data, and further generates an auxiliary data file by providing auxiliary data specific data to the auxiliary data, the auxiliary data specific data for identifying the auxiliary data, the dividing section divides the auxiliary data file into a plurality of auxiliary data elements related to the plurality of video data elements, an i-th auxiliary data element of the plurality of auxiliary data elements is related to the i-th video data element, the dividing section specifies a position in the video data file corresponding to a head of the i-th auxiliary data element, and the dividing section divides the video data file such that a position, which is ahead of the specified position and which is spaced from the specified position by an integer multiple the size of an ECC block unit of the information recording medium, is a head of the i-th video data element.

2. A recording apparatus comprising:

a file generating section for receiving video data including a plurality of video unit data each representing a video and audio data related to the video data, generating a video data file by providing a plurality of video specific data to the plurality of video unit data, the plurality of video specific data for identifying the plurality of video unit data, and generating an audio data file by providing audio specific data to the audio data, the audio specific data for identifying the audio data;

a dividing section for receiving the video data file and the audio data file, dividing the video data file into a plurality of video data elements, and dividing the audio data file into a plurality of audio data elements related to the plurality of video data elements, wherein an i-th (i is an integer) video data element of the plurality of video data elements includes a predetermined number of video unit data of the plurality of video unit data;

an arranging section for arranging the i-th video data element and an i-th audio data element related to the i-th video data element among the plurality of audio data elements such that the i-th audio data element and the i-th video data element are recorded within a predetermined recording unit; and a recording section for recording the arranged i-th video data element and the arranged i-th audio data element on an information recording medium, wherein the file generating section further receives metadata related to the video data and the audio data, and further generates a metadata file by providing metadata specific data to the metadata, the metadata specific data for identifying the metadata, the dividing section divides the metadata file into a plurality of metadata elements related to the plurality of video data elements, an i-th metadata element of the plurality of metadata elements is related to the i-th video data element, the dividing section specifies a position in the metadata file corresponding to a head of the i-th video data element, and the dividing section divides the metadata file such that a position, which is behind the specified position and which is spaced from the specified position by an integer multiple the size of an ECC block unit of the information recording medium, is a head of the i-th metadata element.

3. A recording apparatus comprising:

a file generating section for receiving video data including a plurality of video unit data each representing a video and audio data related to the video data, generating a video data file by providing a plurality of video specific data to the plurality of video unit data, the plurality of video specific data for identifying the plurality of video unit data, and generating an audio data file by providing audio specific data to the audio data, the audio specific data for identifying the audio data;

a dividing section for receiving the video data file and the audio data file, dividing the video data file into a plurality of video data elements, and dividing the audio data file into a plurality of audio data elements related to the plurality of video data elements, wherein an i-th (i is an integer) video data element of the plurality of video data elements includes a predetermined number of video unit data of the plurality of video unit data;

an arranging section for arranging the i-th video data element and an i-th audio data element related to the i-th video data element among the plurality of audio data elements such that the i-th audio data element and the i-th video data element are recorded within a predetermined recording unit; and a recording section for recording the arranged i-th video data element and the arranged i-th audio data element on an information recording medium wherein the dividing section specifies a position in the audio data file corresponding to a head of the i-th video data element, and the dividing section divides the audio data file such that a position, which is behind the specified position and which is spaced from the specified position by an integer multiple the size of the ECC block unit of the information recording medium, is a head of the i-th audio data element.

4. A recording apparatus according to any of claims 1-3, wherein, an I-th (I is an integer) video specific data for identifying the I-th video unit data of the plurality of video unit data among the plurality of video specific data is provided to the I-th video unit data, and the file generating section provides filler data and filler data specific data to the I-th video unit data, the filler data specific data for identifying the filler data, and a total size of the sum of the I-th video unit data, the I-th video specific data, the filler data and the filler data specific data is equal to an integer multiple the size of a sector unit of the information recording medium.

5. A recording apparatus according to any of claims 1-3, wherein a header area is provided on the information recording medium, and the arranging section outputs the audio specific data to the recording section such that the audio specific data is recorded in the header area.

6. A recording apparatus according to claim 1, wherein the file generating section further receives metadata related to the video data and the audio data, and further generates a metadata file by providing metadata specific data to the metadata, the metadata specific data for identifying the metadata,
the dividing section divides the metadata file into a plurality of metadata elements related to the plurality of video data elements, and
the arranging section arranges an i-th metadata element related to the i-th video data element among the plurality of metadata elements and the i-th audio data element such that they are arranged ahead of the i-th video data element within the predetermined recording unit.

7. A recording apparatus according to claim 6, wherein, the arranging section arranges the i-th auxiliary data element related to the i-th video data element among the plurality of auxiliary data elements and the i-th metadata element such that they are adjacent to each other within the predetermined recording unit.

8. A recording apparatus according to claim 7, wherein the i-th auxiliary data element further includes compressed audio data which has been compressed at a higher compressibility than the video unit data.

9. A recording apparatus according to claim 7, wherein the arranging section arranges the i-th auxiliary data element ahead of the i-th video data element.

10. A recording apparatus according to claim 7, wherein the arranging section arranges the auxiliary data element ahead of the metadata element, the audio data element and the video data element.

11. A recording apparatus according to claim 2, wherein the arranging section arranges the i-th metadata element related to the i-th video data element among the plurality of metadata elements and the i-th audio data element such that they are arranged ahead of the i-th video data element within the predetermined recording unit.

12. A recording apparatus according to claim 11, wherein, the file generating section further receives auxiliary data including compressed video data which has been compressed at a higher compressibility than the video data, further generates an auxiliary data file by providing auxiliary data specific data to the auxiliary data,
the auxiliary data specific data for identifying the auxiliary data, the dividing section divides the auxiliary data file into a plurality of auxiliary data elements related to the plurality of video data elements, and
the arranging section arranges an i-th auxiliary data element related to the i-th video data element among the plurality of auxiliary data elements and the i-th metadata element such that they are adjacent to each other within the predetermined recording unit.

13. A recording apparatus according to claim 12, wherein the i-th auxiliary data element further includes compressed audio data which has been compressed at a higher compressibility than the video unit data.

14. A recording apparatus according to claim 12, wherein the arranging section arranges the i-th auxiliary data element ahead of the i-th video data element.

15. A recording apparatus according to claim 12, wherein the arranging section arranges the auxiliary data element ahead of the metadata element, the audio data element and the video data element.

16. A recording apparatus according to claim 3, wherein the file generating section further receives metadata related to the video data and the audio data, and further generates a metadata file by providing metadata specific data to the metadata, the metadata specific data for identifying the metadata,
the dividing section divides the metadata file into a plurality of metadata elements related to the plurality of video data elements, and
the arranging section arranges an i-th metadata element related to the i-th video data element among the plurality of metadata elements and the i-th audio data element such that they are arranged ahead of the i-th video data element within the predetermined recording unit.

17. A recording apparatus according to claim 16, wherein, the file generating section further receives auxiliary data including compressed video data which has been compressed at a higher compressibility than the video data, further generates an auxiliary data file by providing auxiliary data specific data to the auxiliary data,
the auxiliary data specific data for identifying the auxiliary data, the dividing section divides the auxiliary data file into a plurality of auxiliary data elements related to the plurality of video data elements, and
the arranging section arranges an i-th auxiliary data element related to the i-th video data element among the plurality of auxiliary data elements and the i-th metadata element such that they are adjacent to each other within the predetermined recording unit.

18. A recording apparatus according to claim 17, wherein the i-th auxiliary data element further includes compressed audio data which has been compressed at a higher compressibility than the video unit data.

19. A recording apparatus according to claim 17, wherein the arranging section arranges the i-th auxiliary data element ahead of the i-th video data element.

20. A recording apparatus according to claim 17, wherein the arranging section arranges the auxiliary data element ahead of the metadata element, the audio data element and the video data element.

21. A recording apparatus according to any of claims 1-3, wherein when there exists a defective area on the information recording medium,
the arranging section arranges rearrangement data for forming a rearrangement area used to rearrange predetermined data depending on the defective area, as well as the i-th video data element and the i-th audio data element, such that the rearrangement data is recorded within the predetermined recording unit.

22. A recording apparatus according to any of claims 1-3, wherein when there exists a defective area on the information recording medium,
the arranging section arranges shift data for forming a shift area used to shift predetermined data depending on the defective area, as well as the i-th video data element and the i-th audio data element, such that the shift data is recorded within the predetermined recording unit.

23. A recording method comprising the step of:
receiving video data including a plurality of video unit data each representing a video and audio data related to the video data, generating a video data file by providing a plurality of video specific data to the plurality of video unit data, the plurality of video specific data for identifying the plurality of video unit data, and generating an audio data file by providing audio specific data to the audio data, the audio specific data for identifying the audio data;

receiving the video data file and the audio data file, dividing the video data file into a plurality of video data elements, and dividing the audio data file into a plurality of audio data elements related to the plurality of video data elements, wherein an i-th (i is an integer) video data element of the plurality of video data elements includes a predetermined number of video unit data of the plurality of video unit data;

arranging the i-th video data element and an i-th audio data element related to the i-th video data element among the plurality of audio data elements such that the i-th audio data element and the i-th video data element are recorded within a predetermined recording unit; and recording the arranged i-th video data element and the arranged i-th audio data element on an information recording medium wherein the file generating step includes a step of further receiving auxiliary data including compressed video data which has been compressed at a higher compressibility than the video data, and further generating an auxiliary data file by providing auxiliary data specific data to the auxiliary data, the auxiliary data specific data for identifying the auxiliary data, the dividing step includes a step of dividing the auxiliary data file into a plurality of auxiliary data elements related to the plurality of video data elements, an i-th auxiliary data element of the plurality of auxiliary data elements is related to the i-th video data element, the dividing step includes a step of specifying a position in the video data file corresponding to a head of the i-th auxiliary data element, and the dividing step includes a step of dividing the video data file such that a position, which is ahead of the specified position and which is spaced from the specified position by an integer multiple the size of an ECC block unit of the information recording medium, is a head of the i-th video data element.

24. A recording method comprising the step of:

receiving video data including a plurality of video unit data each representing a video and audio data related to the video data, generating a video data file by providing a plurality of video specific data to the plurality of video unit data, the plurality of video specific data for identifying the plurality of video unit data, and generating an audio data file by providing audio specific data to the audio data, the audio specific data for identifying the audio data;

receiving the video data file and the audio data file, dividing the video data file into a plurality of video data elements, and dividing the audio data file into a plurality of audio data elements related to the plurality of video data elements, wherein an i-th (i is an integer) video data element of the plurality of video data elements includes a predetermined number of video unit data of the plurality of video unit data;

arranging the i-th video data element and an i-th audio data element related to the i-th video data element among the plurality of audio data elements such that the i-th audio data element and the i-th video data element are recorded within a predetermined recording unit; and recording the arranged i-th video data element and the arranged i-th audio data element on an information recording medium wherein the file generating step includes a step of further receiving metadata related to the video data and the audio data, and further generating a metadata file by providing metadata specific data to the metadata, the metadata specific data for identifying the metadata, the dividing step includes a step of dividing the metadata file into a plurality of metadata elements related to the plurality of video data elements, an i-th metadata element of the plurality of metadata elements is related to the i-th video data element, the dividing step includes a step of specifying a position in the metadata file corresponding to a head of the i-th video data element, and the dividing step includes a step of dividing the metadata file such that a position, which is behind the specified position and which is spaced from the specified position by an integer multiple the size of an ECC block unit of the information recording medium, is a head of the i-th metadata element.

25. A recording method comprising the step of:

receiving video data including a plurality of video unit data each representing a video and audio data related to the video data, generating a video data file by providing a plurality of video specific data to the plurality of video unit data, the plurality of video specific data for identifying the plurality of video unit data, and generating an audio data file by providing audio specific data to the audio data, the audio specific data for identifying the audio data;

receiving the video data file and the audio data file, dividing the video data file into a plurality of video data elements, and dividing the audio data file into a plurality of audio data elements related to the plurality of video data elements, wherein an i-th (i is an integer) video data element of the plurality of video data elements includes a predetermined number of video unit data of the plurality of video unit data;

arranging the i-th video data element and an i-th audio data element related to the i-th video data element among the plurality of audio data elements such that the i-th audio data element and the i-th video data element are recorded within a predetermined recording unit; and recording the arranged i-th video data element and the arranged i-th audio data element on an information recording medium wherein the dividing step includes a step of specifying a position in the audio data file corresponding to a head of the i-th video data element, and the dividing step includes a step of dividing the audio data file such that a position, which is behind the specified position and which is spaced from the specified position by an integer multiple the size of the ECC block unit of the information recording medium, is a head of the i-th audio data element.

26. A recording method according to any of claims 23-25, wherein, an I-th (I is an integer) video specific data for identifying the I-th video unit data of the plurality of video unit data among the plurality of video specific data is provided to the I-th video unit data, and the file generating step includes a step of providing filler data and filler data specific data to the I-th video unit data, the filler data specific data for identifying the filler data, and a total size of the sum of the I-th video unit data, the I-th video specific data, the filler data and the filler data specific data is equal to an integer multiple the size of a sector unit of the information recording medium.

27. A recording method according to any of claims 23-25, wherein a header area is provided on the information recording medium, and the arranging step includes a step of outputting the audio specific data to the recording section such that the audio specific data is recorded in the header area.

28. A recording method according to any of claims 23, wherein the file generating step includes a step of further receiving metadata related to the video data and the audio data, and further generating a metadata file by providing metadata specific data to the metadata, the metadata specific data for identifying the metadata,
the dividing step includes a step of dividing the metadata file into a plurality of metadata elements related to the plurality of video data elements, and
the arranging step includes a step of arranging an i-th metadata element related to the i-th video data element among the plurality of metadata elements and the i-th audio data element such that they are arranged ahead of the i-th video data element within the predetermined recording unit.

29. A recording method according to claim 28, wherein, the arranging step includes a step of arranging the i-th auxiliary data element related to the i-th video data element among the plurality of auxiliary data elements and the i-th metadata element such that they are adjacent to each other within the predetermined recording unit.

30. A recording method according to claim 29, wherein the i-th auxiliary data element further includes compressed audio data which has been compressed at a higher compressibility than the video unit data.

31. A recording method according to claim 29, wherein the arranging step includes a step of arranging the i-th auxiliary data element ahead of the i-th video data element.

32. A recording method according to claim 29, wherein the arranging step includes a step of arranging the auxiliary data element ahead of the metadata element, the audio data element and the video data element.

33. A recording method according to claim 24, wherein the arranging step includes a step of arranging the i-th metadata element related to the i-th video data element among the plurality of metadata elements and the i-th audio data element such that they are arranged ahead of the i-th video data element within the predetermined recording unit.

34. A recording method according to claim 33, wherein, the file generating step includes a step of further receiving auxiliary data including compressed video data which has been compressed at a higher compressibility than the video data, further generating an auxiliary data file by providing auxiliary data specific data to the auxiliary data, the auxiliary data specific data for identifying the auxiliary data,
the dividing step includes a step of dividing the auxiliary data file into a plurality of auxiliary data elements related to the plurality of video data elements, and the arranging step includes a step of arranging an i-th auxiliary data element related to the i-th video data element among the plurality of auxiliary data elements and the i-th metadata element such that they are adjacent to each other within the predetermined recording unit.

35. A recording method according to claim 34, wherein the i-th auxiliary data element further includes compressed audio data which has been compressed at a higher compressibility than the video unit data.

36. A recording method according to claim 34, wherein the arranging step includes a step of arranging the i-th auxiliary data element ahead of the i-th video data element.

37. A recording method according to claim 34, wherein the arranging step includes a step of arranging the auxiliary data element ahead of the metadata element, the audio data element and the video data element.

38. A recording method according to claim 25, wherein
the file generating step includes a step of further receiving metadata related to the video data and the audio data, and further generating a metadata file by providing metadata specific data to the metadata, the metadata specific data for identifying the metadata,
the dividing step includes a step of dividing the metadata file into a plurality of metadata elements related to the plurality of video data elements, and
the arranging step includes a step of arranging an i-th metadata element related to the i-th video data element among the plurality of metadata elements and the i-th audio data element such that they are arranged ahead of the i-th video data element within the predetermined recording unit.

39. A recording method according to claim 38, wherein, the file generating step includes a step of further receiving auxiliary data including compressed video data which has been compressed at a higher compressibility than the video data, further generating an auxiliary data file by providing auxiliary data specific data to the auxiliary data, the auxiliary data specific data for identifying the auxiliary data,
the dividing step includes a step of dividing the auxiliary data file into a plurality of auxiliary data elements related to the plurality of video data elements, and the arranging step includes a step of arranging an i-th auxiliary data element related to the i-th video data element among the plurality of auxiliary data elements and the i-th metadata element such that they are adjacent to each other within the predetermined recording unit.

40. A recording method according to claim 39, wherein the i-th auxiliary data element further includes compressed audio data which has been compressed at a higher compressibility than the video unit data.

41. A recording method according to claim 39, wherein the arranging step includes a step of arranging the i-th auxiliary data element ahead of the i-th video data element.

42. A recording method according to claim 39, wherein the arranging step includes a step of arranging the auxiliary data element ahead of the metadata element, the audio data element and the video data element.

43. A recording method according to any of claims 23-25, wherein when there exists a defective area on the information recording medium, the arranging step further includes a step of arranging rearrangement data for forming a rearrangement area used to rearrange predetermined data depending on the defective area, as well as the i-th video data element and the i-th audio data element, such that the rearrangement data is recorded within the predetermined recording unit.

44. A recording method according to any of claims 23-34, wherein when there exists a defective area on the information recording medium, the arranging step further includes a step of arranging shift data for forming a shift area used to shift predetermined data depending on the defective area, as well as the i-th video data element and the i-th audio data element, such that the shift data is recorded within the predetermined recording unit.

45. A recording apparatus comprising:
a file generating section for receiving a first contents data including a plurality of contents unit data each representing at least a part of first contents and a second contents data related to the first contents data, generating a first contents data file by providing a plurality of first contents specific data to the plurality of the contents unit data, the plurality of first contents specific data for identifying the plurality of contents unit data, and generating a second contents data file by providing second contents specific data to the second contents data, the second contents specific data for identifying the second contents data;

a dividing section for receiving the first contents data file and the second contents data file, dividing the first contents data file into a plurality of first contents data elements, and dividing the second contents data file into a plurality of second contents data elements related to the plurality of first contents data element, wherein an i-th (i is an integer) first contents data element of the plurality of first contents data elements includes a predetermined number of contents unit data of the plurality of contents unit data;

an arranging section for arranging the i-th first contents data element and an i-th second contents data element related to the i-th first contents data element among the plurality of the second contents data elements such that the i-th second contents data element and the i-th first contents data element are recorded within a predetermined recording unit; and a recording section for recording the arranged i-th first contents data element and the arranged i-th second contents data element on the information recording medium, wherein the dividing section specifies a position in the second contents data file corresponding to a head of the i-th first contents data element, and the dividing section divides the second contents data file such that a position, which is behind the specified position and which is spaced from the specified position by an integer multiple the size of the ECC block unit of the information recording medium, is a head of the i-th second contents element.

46. A recording apparatus according to claim 45, wherein an I-th (I is an integer) first contents specific data for identifying the I-th contents unit data of the plurality of contents unit data among the plurality of first contents specific data is provided to the I-th contents unit data, the file generating section provides filler data and filler data specific data to the I-th contents unit data, the filler data specific data for identifying the filler data, and a total size of the sum of the I-th contents unit data, the I-th first contents specific data, the filler data and the filler data specific data is equal to an integer multiple the size of a sector unit of the information recording medium.

47. A recording apparatus according to claim 45, wherein the first contents is one of a video and an audio.

48. A recording apparatus according to claim 45, wherein the I-th first contents specific data includes first key data which identifies a type of the I-th contents unit data and first length data which indicates a length of the I-th contents unit data, and the filler data specific data includes second key data which identifies a type of the filler data and second length data which indicates a length of the filler data.

49. A recording apparatus according to claim 48, wherein the first contents is one of a video and an audio.

50. A recording apparatus according to claim 45, wherein a header area is provided on the information recording medium, and the arranging section outputs the second contents specific data to the recording section such that the second contents specific data is recorded in the header area.

51. A recording apparatus according to claim 50, wherein the second content is one of a video and an audio.

52. A recording apparatus according to claim 50, wherein the second contents specific data includes key data which identifies a type of the second contents data and length data which indicates a length of the second contents data.

53. A recording apparatus according to claim 52, wherein the second contents is one of a video and an audio.

54. A recording method comprising the steps of:
receiving a first contents data including a plurality of contents unit data each representing at least a part of first contents and a second contents data related to the first contents data, generating a first contents data file by providing a plurality of first contents specific data to the plurality of the contents unit data, the plurality of first contents specific data for identifying the plurality of contents unit data, and generating a second contents data file by providing second contents specific data to the second contents data, the second contents specific data for identifying the second contents data;

receiving the first contents data file and the second contents data file, dividing the first contents data file into a plurality of first contents data elements, and dividing the second contents data file into a plurality of second contents data elements related to the plurality of first contents data element, wherein an i-th (i is an integer) first contents data element of the plurality of first contents data elements includes a predetermined number of contents unit data of the plurality of contents unit data;

arranging the i-th first contents data element and an i-th second contents data element related to the i-th first contents data element among the plurality of the second contents data elements such that the i-th second contents data element and the i-th first contents data element are recorded within a predetermined recording unit; and recording the arranged i-th first contents data element and the arranged i-th second contents data element on the information recording medium wherein the dividing step includes a step of specifying a position in the second contents data file corresponding to a head of the i-th first contents data element, and the dividing step includes a step of dividing the second contents data file such that a position, which is behind the specified position and which is spaced from the specified position by an integer multiple the size of the ECC block unit of the information recording medium, is a head of the i-th second contents data element.

55. A recording method according to claim 54, wherein an I-th (I is an integer) first contents specific data for identifying the I-th contents unit data of the plurality of contents unit data among the plurality of first contents specific data is provided to the I-th contents unit data, the file generating step includes a step of providing filler data and filler data specific data to the I-th contents unit data, the filler data specific data for identifying the filler data, and a total size of the sum of the I-th contents unit data, the I-th first contents specific data, the filler data and the filler data specific data is equal to an integer multiple the size of a sector unit of the information recording medium.

56. A recording method according to claim 55, wherein the first contents is one of a video and an audio.

57. A recording method according to claim 55, wherein the I-th first contents specific data includes first key data which identifies a type of the I-th contents unit data and first length data which indicates a length of the I-th contents unit data, and the filler data specific data includes second key data which identifies a type of the filler data and second length data which indicates a length of the filler data.

58. A recording method according to claim 57, wherein the first contents is one of a video and an audio.

59. A recording method according to claim 54, wherein a header area is provided on the information recording medium, and the arranging step includes a step of outputting the second contents specific data to the recording section such that the second contents specific data is recorded in the header area.

60. A recording method according to claim 59, wherein the second content is one of a video and an audio.

61. A recording method according to claim 59, wherein the second contents specific data includes key data which identifies a type of the second contents data and length data which indicates a length of the second contents data.

62. A recording method according to claim 61, wherein the second contents is one of a video and an audio.

63. An information recording medium comprising:
a plurality of video data elements obtained by dividing a video data file including a plurality of video unit data, each of the plurality of video unit data representing a video; and
a plurality of auxiliary data elements, each of the plurality of auxiliary data elements including compressed video data which has been compressed at a higher compressibility than the plurality of video unit data, the plurality of auxiliary data elements being related to the plurality of video data elements,
wherein an i-th (i is an integer) video data element of the plurality of video data elements is related to an i-th auxiliary data element of the plurality of auxiliary data elements, and a position in the video data file, which is ahead of a predetermined position corresponding to a head of the i-th auxiliary data element and which is spaced from the predetermined position by an integer multiple the size of an ECC block unit of the information recording medium, is a head of the i-th video data element.

64. An information recording medium comprising:
a plurality of video data elements including video data; and
a plurality of metadata elements obtained by dividing a metadata file including metadata related to the video data; wherein an i-th (i is an integer) video data element of the plurality of video data elements is related to an i-th metadata element of the plurality of metadata elements, and a position in the metadata file, which is behind a predetermined position corresponding to a head of the i-th video data element and which is spaced from the predetermined position by an integer multiple the size of an ECC block unit of the information recording medium, is a head of the i-th metadata element.

65. An information recording medium comprising:
a plurality of video data elements including video data; and
a plurality of audio data elements obtained by dividing an audio data file including audio data related to the video data, wherein an i-th (i is an integer) video data element of the plurality of video data elements is related to an i-th audio data element of the plurality of audio data elements, a position in the audio data file, which is behind a predetermined position corresponding to a head of the i-th video data element and which is spaced from the predetermined position by an integer multiple the size of an ECC block unit of the information recording medium, is a head of the i-th audio data element.

66. An information recording medium according to any of claims 63-65 wherein a video data element includes video unit data representing a video the information recording medium further comprises:
filler data provided to the video unit data; and filler data specific data for identifying the filler data, wherein a total size of the sum of the video unit data, the video specific data, the filler data and the filler data specific data is equal to an integer multiple the size of a sector unit of the information recording medium.

67. An information recording medium according to any of claims 63-65 wherein a header area is provided,
wherein audio specific data for identifying the audio data is recorded in the header area.

68. An information recording medium according to any of claims 63-65 wherein
a metadata element related to the video data element and the audio data element related to the video data element are arranged ahead of a video data element including video unit data representing a video within a predetermined recording unit.

69. An information recording medium according to claim 68, wherein the information recording medium further includes an auxiliary data element including compressed video data which has been compressed at a higher compressibility than the video unit data, the auxiliary data element being related to the video data element, and the metadata element and the auxiliary data element are arranged such that they are adjacent to each other within the predetermined recording unit.

70. An information recording medium according to claim 69, wherein the auxiliary data element further includes compressed audio data which has been compressed at a higher compressibility than the video unit data.

71. An information recording medium according to claim 69, wherein the auxiliary data element is arranged ahead of the video data element.

72. An information recording medium according to claim 69, wherein the auxiliary data element is arranged ahead of the metadata element, the audio data element and the video data element.

73. An information recording medium according to any of claims 63-65 wherein the information recording medium further comprises a rearrangement area, when there exists a defective area on the information recording medium, the rearrangement area is used to rearrange predetermined data depending on the defective area.

74. An information recording medium according to any of claims 63-65 wherein the information recording medium further comprises a shift area, when there exists a defective area on the information recording medium, the shift area is used to shift predetermined data depending on the defective area.

75. An information recording medium according to claim 74, wherein the predetermined data is the video data element.

76. An information recording medium according to any of claims 63-65 comprising:
contents unit data representing at least a part of contents;
contents specific data for identifying the contents unit data;
filler data provided to the contents unit data; and filler data specific data for identifying the filler data, wherein a total size of the sum of the contents unit data, the contents specific data, the filler data and the filler data specific data is equal to an integer multiple the size of a sector unit of the information recording medium.

77. An information recording medium according to claim 76, wherein the contents is one of a video and an audio.

78. An information recording medium according to claim 76, wherein the contents specific data includes first key data which identifies a type of the contents unit data and first length data which indicates a length of the contents unit data, and the filler data specific data includes second key data which identifies a type of the filler data and second length data which indicates a length of the filler data.

79. An information recording medium according to claim 78, wherein the contents is one of a video and an audio.

80. An information recording medium according to any of claims 63-65 wherein a header area is provided, further comprising:
  contents data representing at least a part of contents; and
  contents specific data for identifying the contents data, wherein the contents specific data is recorded in the header area.

81. An information recording medium according to claim 80, wherein the contents is one of a video and an audio.

82. An information recording medium according to claim 80, wherein the contents specific data includes key data which identifies a type of the contents data and length data which indicates a length of the contents data.

83. An information recording medium according to claim 82, wherein the contents is one of a video and an audio.

* * * * *